(12) United States Patent
Oshiba et al.

(10) Patent No.: US 10,522,798 B2
(45) Date of Patent: Dec. 31, 2019

(54) ENERGY STORAGE APPARATUS

(71) Applicant: GS Yuasa International Ltd., Kyoto-shi (JP)

(72) Inventors: Masashi Oshiba, Kyoto (JP); Hiroyasu Koyama, Kyoto (JP); Yuta Mizukawa, Kyoto (JP); Kazuya Fujisawa, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 772 days.

(21) Appl. No.: 14/297,507

(22) Filed: Jun. 5, 2014

(65) Prior Publication Data

US 2014/0370353 A1 Dec. 18, 2014

(30) Foreign Application Priority Data

Jun. 14, 2013 (JP) ................................. 2013-125958
Apr. 7, 2014 (JP) ................................. 2014-078555

(51) Int. Cl.
*H01M 2/10* (2006.01)
*H01M 10/625* (2014.01)
(Continued)

(52) U.S. Cl.
CPC ....... *H01M 2/1077* (2013.01); *H01M 2/0217* (2013.01); *H01M 10/613* (2015.04); *H01M 10/625* (2015.04); *H01M 10/6563* (2015.04)

(58) Field of Classification Search
CPC ............. H01M 2/1077; H01M 10/613; H01M 10/625; H01M 10/6563; H01M 2/0217
(Continued)

(56) References Cited

U.S. PATENT DOCUMENTS 5,492,779 A * 2/1996 Ronning ............... H01M 2/024
429/120
8,403,090 B2 3/2013 Fujiwara et al.
(Continued)

FOREIGN PATENT DOCUMENTS

EP 2160790 A1 * 3/2010 .......... H01M 2/0277
EP 2 575 192 A1 4/2013
(Continued)

OTHER PUBLICATIONS

English translation of Yoon, EP-2160790-A1, Mar. 2010, EP (Year: 2010).*
(Continued)

*Primary Examiner* — Cynthia H Kelly
*Assistant Examiner* — Rashid A Alam
(74) *Attorney, Agent, or Firm* — McGinn I.P. Law Group, PLLC

(57) ABSTRACT

An energy storage apparatus including: a module unit including one or more energy storage devices and a module case that is a container that holds the one or more energy storage devices; and a first protrusion that protrudes from at least one of an energy storage device bottom surface and a first case surface of the module case so as to form a first space defined by the energy storage device bottom surface and the first case surface, the energy storage device bottom surface being a bottom surface of at least one of the one or more energy storage devices, the first case surface being opposed to the energy storage device bottom surface.

20 Claims, 13 Drawing Sheets

(51) Int. Cl.
*H01M 10/6563* (2014.01)
*H01M 10/613* (2014.01)
*H01M 2/02* (2006.01)

(58) Field of Classification Search
USPC ........................................................ 429/120
See application file for complete search history.

(56) References Cited

U.S. PATENT DOCUMENTS

| | | |
|---|---|---|
| 8,551,635 B2 | 10/2013 | Ochi et al. |
| 9,159,970 B2 | 10/2015 | Watanabe et al. |
| 2010/0196749 A1 | 8/2010 | Yoshida et al. |
| 2011/0008656 A1 | 1/2011 | Tanahashi et al. |
| 2011/0020677 A1* | 1/2011 | Shin ............... H01M 2/1077 429/71 |
| 2011/0212355 A1* | 9/2011 | Essinger ........... H01M 2/1016 429/120 |
| 2012/0082875 A1 | 4/2012 | Watanabe et al. |
| 2012/0121949 A1* | 5/2012 | Eberhard ............ H01M 2/105 429/82 |
| 2012/0227931 A1 | 9/2012 | Heckenberger et al. |
| 2012/0312614 A1 | 12/2012 | Fujiwara et al. |
| 2013/0034764 A1 | 2/2013 | Ochi et al. |
| 2013/0078488 A1* | 3/2013 | Nemoto ............ H01M 2/1077 429/82 |
| 2013/0252059 A1* | 9/2013 | Choi ................. B29C 70/20 429/100 |
| 2013/0260220 A1* | 10/2013 | Ahn ................. H01M 2/04 429/164 |
| 2014/0023893 A1 | 1/2014 | Shimizu et al. |
| 2014/0065455 A1* | 3/2014 | Chuang ............ H01M 2/1083 429/71 |
| 2014/0120400 A1* | 5/2014 | Yoshioka ............ H01M 2/1077 429/120 |
| 2015/0044538 A1* | 2/2015 | Katayama ......... H01M 10/6556 429/120 |

FOREIGN PATENT DOCUMENTS

| | | | |
|---|---|---|---|
| EP | 2 597 700 A1 | 5/2013 | |
| JP | S 02-001729 Y | 3/1927 | |
| JP | S 12-016820 Y | 11/1937 | |
| JP | S 48-022937 A | 3/1973 | |
| JP | S 50-023619 U1 | 3/1975 | |
| JP | 2005-302590 A | 10/2005 | |
| JP | 2008-282648 A | 11/2008 | |
| JP | 2009-099442 A | 5/2009 | |
| JP | 2009-211835 A | 9/2009 | |
| JP | 2009-212055 A | 9/2009 | |
| JP | 2010-238554 A | 10/2010 | |
| JP | 2011-096398 A | 5/2011 | |
| JP | 2012-079511 A | 4/2012 | |
| JP | 2012-160315 A | 8/2012 | |
| JP | 2012-238522 A | 12/2012 | |
| JP | 2012-248482 A | 12/2012 | |
| JP | 2012-256468 A | 12/2012 | |
| JP | 5109559 B2 | 12/2012 | |
| JP | WO 2012173269 A1 * | 12/2012 | .......... H01M 2/1077 |
| JP | 2013-033668 A | 2/2013 | |
| JP | WO 2013084937 A1 * | 6/2013 | ........ H01M 10/6556 |

OTHER PUBLICATIONS

Extended European Search Report dated Nov. 20, 2014, with English translation thereof.
European Office Action, dated Feb. 2, 2017.
European Office Action, dated Feb. 2, 2017, in European Application No. EP14 171 298.4.

* cited by examiner

ENERGY STORAGE APPARATUS

CROSS REFERENCE TO RELATED APPLICATIONS

The present application is based on and claims priority of Japanese Patent Application No. 2013-125958 filed on Jun. 14, 2013 and Japanese Patent Application No. 2014-078555 filed on Apr. 7, 2014. The entire disclosures of the above-identified applications, including the specifications, drawings, and claims are incorporated herein by reference in its entirety.

FIELD

The present invention relates to an energy storage apparatus including one or more energy storage devices housed in a module case.

BACKGROUND

Battery packs (energy storage packs) that include a plurality of battery modules (energy storage apparatuses) housed in a pack case are well known. The plurality of battery modules each include one or more battery cells (energy storage devices) housed in a module case. It is necessary to cool the battery modules since they generate heat when the battery cells are repeatedly charged and discharged.

In light of this necessity, a battery pack capable of cooling battery modules housed in a pack case has been proposed (for example, see Japanese Patent No. 5109559). In this battery pack, the battery modules are cooled from outside the module cases by providing a heat dissipating component between module cases of the battery modules and the pack case (battery case).

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an energy storage apparatus capable of efficiently cooling an energy storage device housed in a module case.

An energy storage apparatus according to one aspect of the present invention includes: a module unit including one or more energy storage devices and a module case holding the one or more energy storage devices; and a first protrusion that protrudes from at least one of an energy storage device bottom surface and a first case surface of the module case so as to form a first space defined by the energy storage device bottom surface and the first case surface, the energy storage device bottom surface being a bottom surface of at least one of the one or more energy storage devices, the first case surface being opposed to the energy storage device bottom surface.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENT

Figure 1:
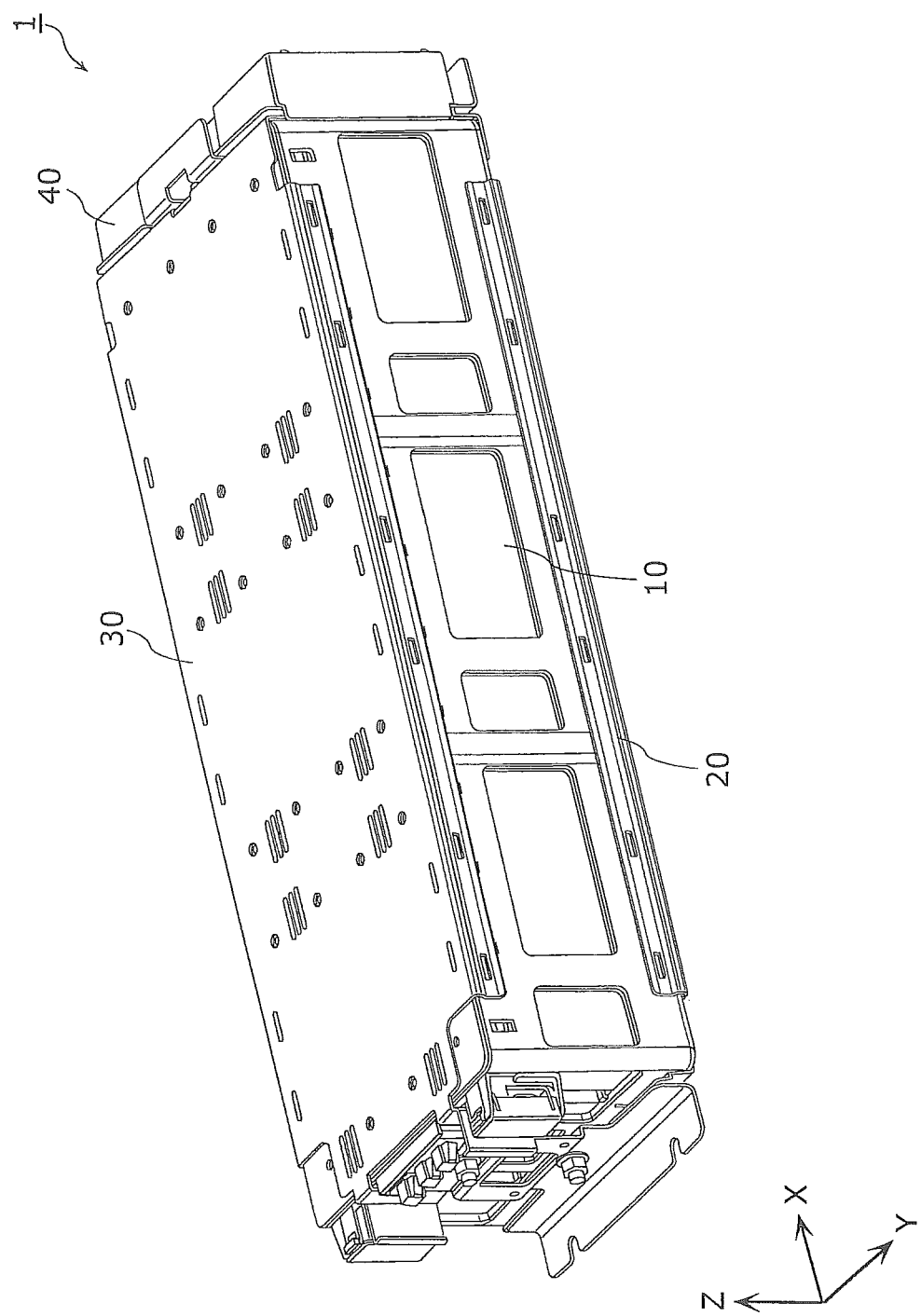
FIG. 1 is an external perspective view of an energy storage apparatus according to an embodiment of the present invention.

With the conventional configuration, although the battery modules are cooled, the battery cells, which are the source of heat, cannot be efficiently cooled since the battery modules are cooled from outside the module cases.

The heat generated by the battery cells pools between the battery cells and the inner surface of the module cases of the battery modules. With the conventional configuration, since the battery modules are cooled from outside the module cases of the battery modules, the battery cells can only be cooled indirectly. As such, the battery cells cannot be efficiently cooled with the above background art. If the battery cells cannot be efficiently cooled, the battery modules cannot be efficiently cooled.

The present invention was conceived in view of the above and aspects of the present invention provide an energy storage apparatus capable of efficiently cooling an energy storage device housed in a module case.

An energy storage apparatus according to one aspect of the present invention includes: a module unit including one or more energy storage devices and a module case holding the one or more energy storage devices; and a first protrusion that protrudes from at least one of an energy storage device bottom surface and a first case surface of the module case so as to form a first space defined by the energy storage device bottom surface and the first case surface, the energy storage device bottom surface being a bottom surface of at least one of the one or more energy storage devices, the first case surface being opposed to the energy storage device bottom surface.

With this, the energy storage apparatus includes the first protrusion that protrudes from at least one of the energy storage device bottom surface and the first case surface of the module case so as to form the first space defined by the energy storage device bottom surface and the first case surface. Since this configuration allows the heat generated by the energy storage device to be dissipated via the first space formed by the first protrusion, it is possible to efficiently cool the energy storage device disposed in the module case.

Moreover, the first protrusion may include protrusions disposed at positions corresponding to at least two of four corners of the energy storage device bottom surface.

With this, since the protrusions are disposed at positions corresponding to at least two of the four corners of the energy storage device bottom surface, it is possible to support the energy storage device in at least two locations of the four corners of the energy storage device bottom surface when the energy storage device is disposed in the module case. This makes it possible to securely mount the energy storage device in the module case.

Moreover, the first protrusion may include a central protrusion disposed at a position corresponding to a central portion of the energy storage device bottom surface.

With this, since the central protrusion is disposed at a position corresponding to the central portion of the energy storage device bottom surface, it is possible to support the energy storage device in the central portion of the energy storage device bottom surface when the energy storage device is disposed in the module case.

Moreover, the energy storage apparatus may further include a second protrusion that protrudes from at least one of an energy storage device side surface and a second case surface of the module case so as to form a second space defined by the energy storage device side surface and the second case surface, the energy storage device side surface being a side surface of at least one of the one or more energy storage devices, the second case surface being opposed to the energy storage device side surface.

With this, the energy storage apparatus includes the second protrusion that protrudes from at least one of the energy storage device side surface and the second case surface of the module case so as to form the second space defined by the energy storage device side surface and the second case surface. Since this configuration allows the heat generated by the energy storage device to be dissipated via the second space formed by the second protrusion, it is possible to efficiently cool the energy storage device disposed in the module case.

Moreover, the first space and the second space may be communicated with each other.

With this, since the first space corresponding to the energy storage device bottom surface and the second space corresponding to the energy storage device side surface are communicated with each other, the heat generated by the energy storage device is dissipated via the first space and the second space. This makes it possible to efficiently cool the energy storage device and keep the heat from pooling between the energy storage device and the module case.

Moreover, the first case surface may be devoid of a through-hole in a region corresponding to the energy storage device bottom surface.

With this, since a through-hole is not formed in the portion of the module case opposed to the energy storage device bottom surface, even if the module case is mounted on a conductive material, it is possible to maintain electrical insulation between the energy storage device and the conductive material. In other words, it is possible to efficiently cool the energy storage device even if the module case has a configuration devoid of a through-hole in order to prevent electrical shorting between the energy storage device and the conductive material.

Moreover, the energy storage device having the energy storage device bottom surface may include a sheet that covers side surfaces, the side surfaces bordering the energy storage device bottom surface.

With this, since the side surfaces of the energy storage device are covered by the sheet, the heat from the energy storage device is more easily dissipated from the bottom surface than the side surfaces of the energy storage device. This makes it possible to efficiently cool the energy storage device by dissipating heat via the first space formed toward the bottom surface of the energy storage device.

Moreover, the energy storage apparatus may include the plurality of module units, and the energy storage apparatus may further include a plate-like member on which the plurality of module units are mounted.

With this, by mounting the plurality of module units on the plate-like member, it is possible to collectively dispose the plurality of module units and possible freely introduce coolant that cools the plurality of module units.

Moreover, adjacently arranged module units included in the plurality of module units may be electrically connected.

This makes it possible to easily connect the plurality of module units in the energy storage apparatus by electrically connecting adjacent module units together.

Moreover, each of the plurality of module units may include a plurality of the energy storage devices housed in the module case, and the plurality of module units may be arranged such that a direction of alignment thereof intersects a direction of alignment of the plurality of energy storage devices included in each of the plurality of module units.

With this, since the plurality of module units and the plurality of energy storage devices are mutually aligned in orthogonal directions, it is possible to introduce coolant between the plurality of energy storage devices by introducing the coolant in the direction of alignment of the plurality of module units.

Moreover, the plate-like member may include a first vertical wall at a first end of the plurality of module units in a direction of alignment of the plurality of module units and a second vertical wall at a second end of the plurality of module units in the direction of alignment, and the first vertical wall and the second vertical wall may each include an opening communicating with the first space.

Here, the first vertical wall and the second vertical wall are provided for fixing the plurality of module units to the plate-like member, but when coolant flows in the alignment direction of the plurality of module units, there is concern that the first vertical wall and the second vertical wall will block the flow of the coolant. As such, by providing the openings in the first vertical wall and the second vertical wall which are in communication with the first space, when the coolant flows in the direction of alignment of the plurality of module units, the coolant can be introduced into and expelled from the first space through the openings.

Moreover, the energy storage apparatus may further include a cooling apparatus that introduces a coolant into the module case included in each of the plurality of module units.

With this, since the energy storage apparatus includes the cooling apparatus that introduces the coolant into each of the module cases, heat pooled in each of the plurality of module units can be dissipated and each of the plurality of module units can be efficiently cooled.

Moreover, the cooling apparatus may be opposed to, among the plurality of module units, an outermost module unit in a direction of alignment of the plurality of module units.

With this, disposing the cooling apparatus in a position opposed to the module unit situated at the end in the direction of alignment of the plurality of module units makes it possible for the coolant to flow in this direction of alignment, and as such, the plurality of module units can be cooled by flow of the coolant therethrough.

Moreover, the module case included in each of the plurality of module units may include a side wall having a plurality of openings, and the side wall may include a pillar that partitions the plurality of openings and extends in a direction intersecting a direction of alignment of the plurality of module units.

Here, the bigger the opening is in the side wall of the module case, the easier heat from the energy storage device can escape the module case. However, large openings also reduce the strength of the module case. Since the side wall of the module case includes the pillar, the strength of the module case can be increased.

Moreover, the module case may include a pair of side walls that are opposed to each other and each include the pillar, and the pillar included in each of the pair of side walls may be provided in a different position in the direction of alignment of the plurality of module units.

Here, if the pillars provided in the pair of side walls of the module case are arranged in the same positions in the direction of alignment, when two module cases are adjacently arranged, the pillars overlap each other and block the flow of coolant in the direction of alignment. By providing the pillars in different positions in the direction of alignment, the flow of coolant in the direction of alignment is not blocked by the pillars, and the coolant can flow freely.

Hereinafter, the energy storage apparatus according to an exemplary embodiment of the present invention is described in greater detail with reference to the accompanying drawings. It should be noted that the embodiment described below shows a preferred, specific example of the present invention. The numerical values, shapes, materials, structural elements, the arrangement and connection of the structural elements etc. shown in the following embodiment are mere examples, and therefore do not limit the present invention. Moreover, among the structural elements in the following embodiment, structural elements not recited in any one of the independent claims defining the most generic part of the inventive concept are described as arbitrary structural elements.

(Embodiment)

First, the configuration of an energy storage apparatus 1 will be described.

Figure 2:
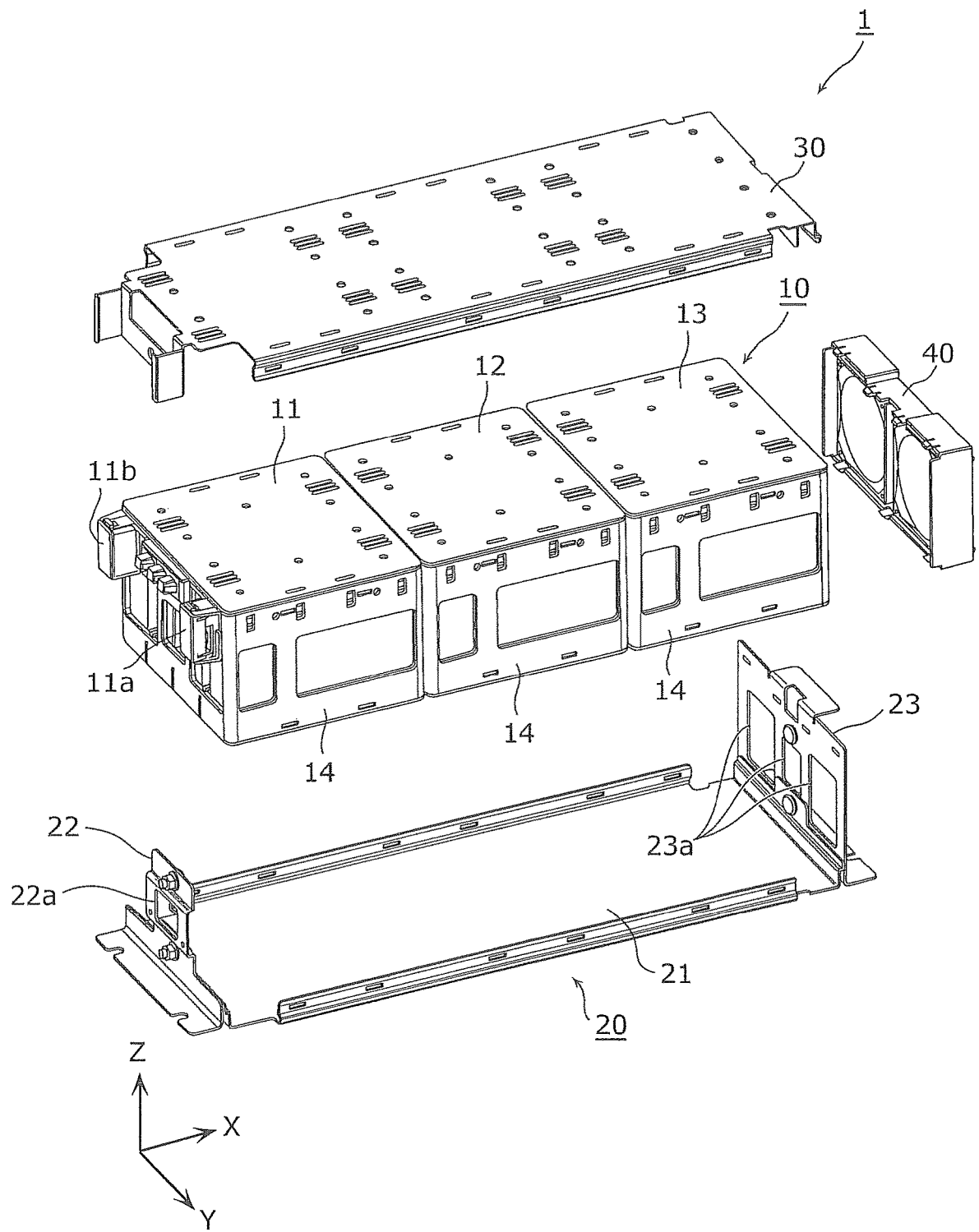
FIG. 2 is an exploded perspective view illustrating structural components of the energy storage apparatus.

FIG. 1 is an external perspective view of the energy storage apparatus 1 according to the embodiment of the present invention. FIG. 2 is an exploded perspective view illustrating structural components of the energy storage apparatus 1.

It should be noted that the Z axis is shown as being the vertical direction in FIG. 1 and FIG. 2. The Z axis is exemplified as being the vertical direction in the following description as well, but depending on the mode of use, it is conceivable that the Z axis may be a direction other than the vertical direction. As such, the Z axis is not limited to the vertical direction. The same applies to other drawings as well.

The energy storage apparatus 1 is an energy storage module capable of charging electricity from an external source and discharging electricity to an external device. The energy storage apparatus 1 is, for example, a high-voltage battery module used to store energy and/or used as a power source.

As is illustrated in FIG. 1 and FIG. 2, the energy storage apparatus 1 includes a module group 10 including module units 11, 12, and 13, a lower coupling component 20, an upper coupling component 30, and a cooling apparatus 40. It should be noted that the energy storage apparatus 1 may include only one module unit.

The module units 11, 12, and 13 included in the module group 10 are aligned along the X axis. The module unit 11 includes an external positive terminal cover 11a which covers the external positive terminal (to be described later) and an external negative terminal cover 11b which covers the external negative terminal (to be described later). The energy storage apparatus 1 charges electricity from an external source and discharges electricity to an external device through the external positive terminal under the external positive terminal cover 11a and the external negative terminal under the external negative terminal cover 11b.

The module units 11, 12, and 13 are rectangular modules including one or more energy storage devices housed in a module case 14. Each of the module units 11, 12, and 13 has the same configuration. Moreover, the positive terminals and negative terminals of adjacent ones of the module units 11, 12, and 13 are electrically connected, whereby all energy storage devices in the module units 11, 12, and 13 are connected in series. The configuration of the module units 11, 12, and 13 will be described in detail later.

The lower coupling component 20 and the upper coupling component 30 are components which couple the module units 11, 12, and 13 together. The lower coupling component 20 couples the module units 11, 12, and 13 from below and the upper coupling component 30 couples the module units 11, 12, and 13 from above. In other words, fixing the lower coupling component 20 and the upper coupling component 30 together with the module units 11, 12, and 13 disposed therebetween couples the module units 11, 12, and 13 together.

More specifically, the lower coupling component 20 and the upper coupling component 30 are plate-like members formed, for example, from a conductive material such as metal. With this, the module units 11, 12, and 13 are firmly and securely fixed. It should be noted that since it is usually difficult to electrically insulate the surfaces of the lower coupling component 20 and the upper coupling component 30 with a coating, the lower coupling component 20 and the upper coupling component 30 have conductive properties.

Moreover, each module case 14 of the module units 11, 12, and 13 is mounted on the lower coupling component 20.

Here, the lower coupling component 20 includes a bottom portion 21, a first vertical wall 22 and a second vertical wall 23. The bottom portion 21 is a plate-like member on which the module units 11, 12, and 13 are mounted. The first vertical wall 22 is a vertical wall provided at one end of the module units 11, 12, and 13 in the direction of alignment thereof, and the second vertical wall 23 is a vertical wall provided at the other end in the direction of alignment. In other words, the first vertical wall 22 is a wall provided standing at one end of the bottom portion 21 in the direction of alignment, and the second vertical wall 23 is a wall provided standing at the other end of the bottom portion 21 in the direction of alignment.

Moreover, the first vertical wall 22 includes an opening 22a and the second vertical wall 23 includes an opening 23a. The opening 22a is a rectangular through-hole formed in the central portion of the first vertical wall 22. The opening 23a includes three rectangular through-holes aligned along the Y axis and formed in the central portion of the second vertical wall 23.

Here, the opening 22a and the opening 23a are openings communicating with the first space 110b (to be described later). In other words, by forming the opening 22a and the opening 23a, the first space 110b is in communication with the outside of the energy storage apparatus 1 via the opening 22a and the opening 23a, and not blocked off by the first vertical wall 22 and the second vertical wall 23.

It should be noted that the opening 22a and the opening 23a are not required to be rectangular through-holes. The opening 22a and the opening 23a may be circular or triangular through-holes, and may be rectangular or semi-circular cut-outs, for example. Moreover, the number of through-holes included in the opening 22a and the opening 23a is not limited to the above-described number.

The cooling apparatus 40 is a fan located on a side of the module group 10 in the positive direction of the X axis that introduces a coolant into the module group 10. In other words, the cooling apparatus 40 is located in a position opposed to the end of the module unit 13 in the direction of alignment of the module units 11, 12, and 13. The cooling apparatus 40 draws in outside air (the coolant) from the end of the module group 10 in the negative direction of the X axis, and introduces air into each module case 14 of the module units 11, 12, and 13. The cooling apparatus 40 then expels the air from the end of the module group 10 in the positive direction of the X axis out the back of the cooling apparatus 40.

It should be noted that the cooling apparatus 40 may draw in outside air from the end of the module group 10 in the positive direction of the X axis and expel the air from the end of the module group 10 in the negative direction of the X axis. Moreover, the coolant introduced into the module group 10 by the cooling apparatus 40 is not limited to atmospheric air. For example, the coolant may be cold air chilled by a condenser. Furthermore, in the embodiment, the cooling apparatus 40 is provided with two fans, but number of fans the cooling apparatus 40 has is not limited to this example. Still further, the cooling apparatus 40 is not limited to the use of a fan. As long as it introduces the coolant into the module group 10, something other than a fan may be used.

Next, the configuration of the module units 11, 12, and 13 included in the module group 10 will be described in detail. It should be noted that each of the module units 11, 12, and 13 have the same configuration. As such, the following description focuses on the module unit 11, and descriptions of the module units 12 and 13 are omitted.

Figure 3:
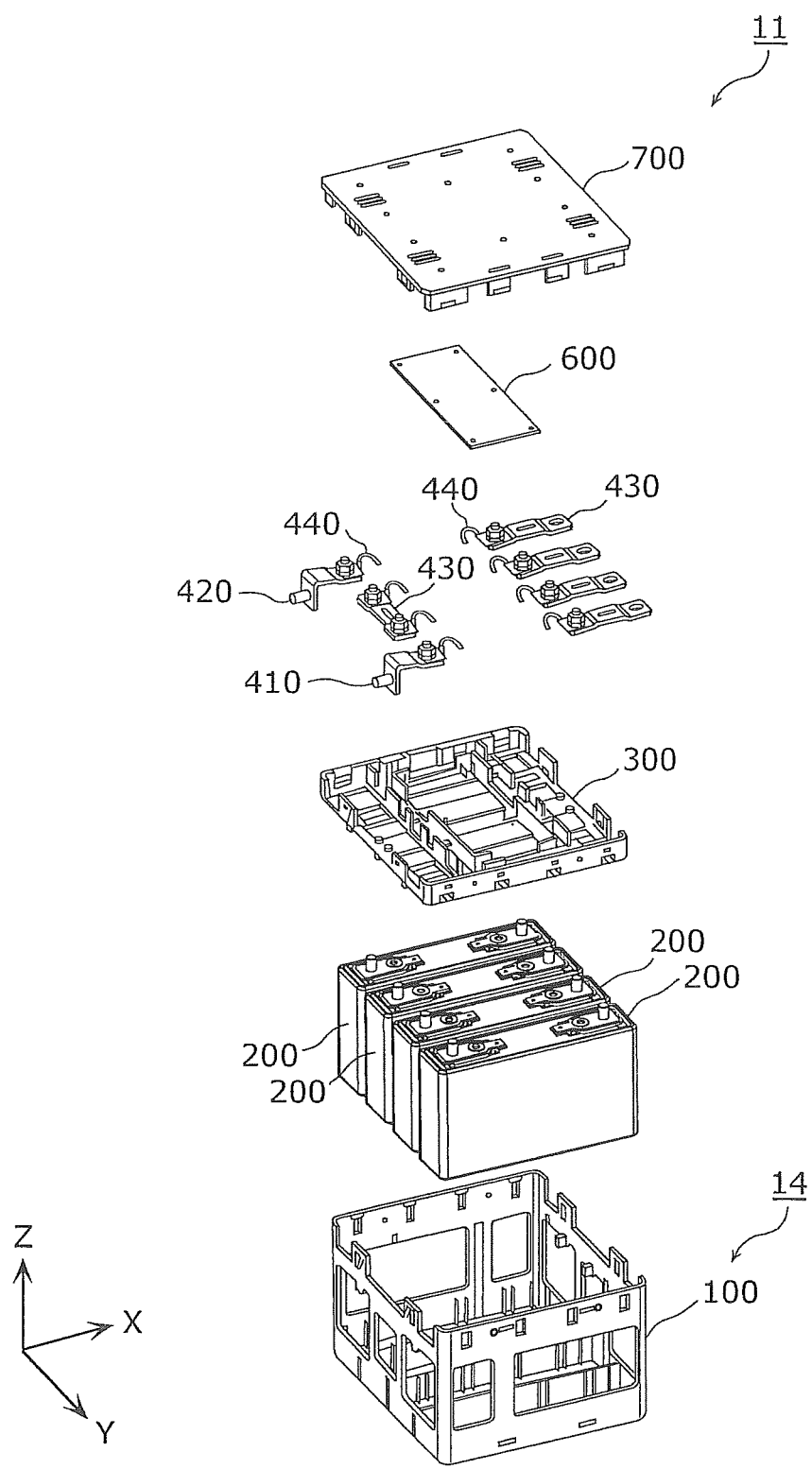
FIG. 3 is an exploded perspective view illustrating structural components of a module unit.

FIG. 3 is an exploded perspective view illustrating structural components of the module unit 11 according to the embodiment of the present invention.

As is illustrated in FIG. 3, the module unit 11 includes: the module case 14 including a case main body 100 and the cover 700; a plurality of energy storage devices 200 (in the embodiment, four of the energy storage devices 200 are provided) housed in the module case 14; a restricting component 300; bus bars 430, and a substrate 600. It should be noted that one energy storage device 200 may be housed in the module case 14 instead of a plurality of the energy storage devices 200.

The module case 14 is a rectangular (box-shaped) container acting as an outer housing for the module unit 11. The module case 14 arranges the energy storage devices 200 and the substrate 600 and such in given positions and protects the energy storage devices 200 and the substrate 600 and such from impact. The module case 14 is made of a material having insulating properties, such as a resin, like polycarbonate, for example. This keeps the energy storage device 200 and the substrate 600 and such from coming into contact with, for example, external metal components.

Here, the module case 14 includes the case main body 100 and the cover 700. The case main body 100 is a rectangular, tubular component having a bottom, and serves as the main body of the module case 14. The cover 700 is a low-profile, rectangular component that covers the opening of the case main body 100, and serves as the cover of the module case 14.

More specifically, the energy storage devices 200, the restricting component 300, and the bus bars 430 are arranged in this order in the case main body 100, and then the opening of the case main body 100 is closed off with the cover 700. Arranging the heavy energy storage devices 200 on the bottom in this way improves the stability of the module unit 11. The configuration of the case main body 100 will be described in detail later.

Here, the energy storage devices 200 are aligned along the Y axis inside the case main body 100. In other words, the direction of alignment of the energy storage devices 200 is a direction intersecting (orthogonal in the embodiment) the direction of alignment of the module units 11, 12, and 13. That is to say, the direction of alignment of the module units 11, 12, and 13 is a direction intersecting (orthogonal in the embodiment) the direction of alignment of the plurality of energy storage devices 200 included in each of the module units 11, 12, and 13.

The restricting component 300 is a low-profile, rectangular component arranged above the energy storage devices 200. The restricting component 300 is made of a material having insulating properties, such as resin. Here, the restricting component 300 is a component that restricts the positioning of the energy storage devices 200 included in the case main body 100. More specifically, the restricting component 300 fits inside the case main body 100 and holds down the energy storage device 200 from above, thereby fixing the energy storage devices 200 to the case main body 100.

Moreover, the substrate 600 is mounted on the restricting component 300. In this way, the restricting component 300 functions as a mounting plate for the substrate 600 in addition to functioning to fix the energy storage devices 200 to the case main body 100.

The bus bars 430 are arranged above the restricting component 300. The bus bars 430 are made of a conductive material, such as metal, and electrically connect the energy storage devices 200 together. More specifically, the bus bar 430 connects the positive terminal or negative terminal of one of two adjacently arranged energy storage devices 200 to the negative terminal or positive terminal of the other of the two adjacently arranged energy storage devices 200.

The module unit 11 moreover includes an external positive terminal 410 arranged in the external positive terminal cover 11a and an external negative terminal 420 arranged in the external negative terminal cover 11b. The external positive terminal 410 and the external negative terminal 420 are electrode terminals for charging the energy storage apparatus 1 with electricity from an external source and discharging electricity to an external device. In other words, the energy storage apparatus 1 is charged with electricity from an external source and discharges electricity to an external device via the external positive terminal 410 and the external negative terminal 420.

The substrate 600 is a substrate capable of obtaining, monitoring, and controlling the state of the energy storage devices 200, and is connected to the energy storage devices 200 via wiring 440. Here, the wiring 440 is a lead wire connecting the positive terminal 230 or the negative terminal 240 of the energy storage device 200 to the substrate 600. It should be noted that the illustration of the wiring 440 is partially omitted in FIG. 3.

More specifically, the substrate 600 is a control substrate for monitoring, for example, the charging state and discharging state (the state of the battery, such as voltage or temperature) of the energy storage devices 200. The substrate 600 is provided with a control circuit (not shown in the drawings) for performing the above-described monitoring, controlling the on and off states of a relay, or communicating with other devices.

The substrate 600 is located on the restricting component 300, and arranged so as to be covered by the cover 700. In other words, the substrate 600 is arranged so as to be protected by the restricting component 300 and the cover 700 as a result of being sandwiched between the restricting component 300 and the cover 700. Moreover, integrating the electrical components in the upper portion of the energy storage apparatus 1 makes assembly and maintenance of the energy storage apparatus 1 easier.

Next, the configuration of the energy storage device 200 will be described in detail.

Figure 4:
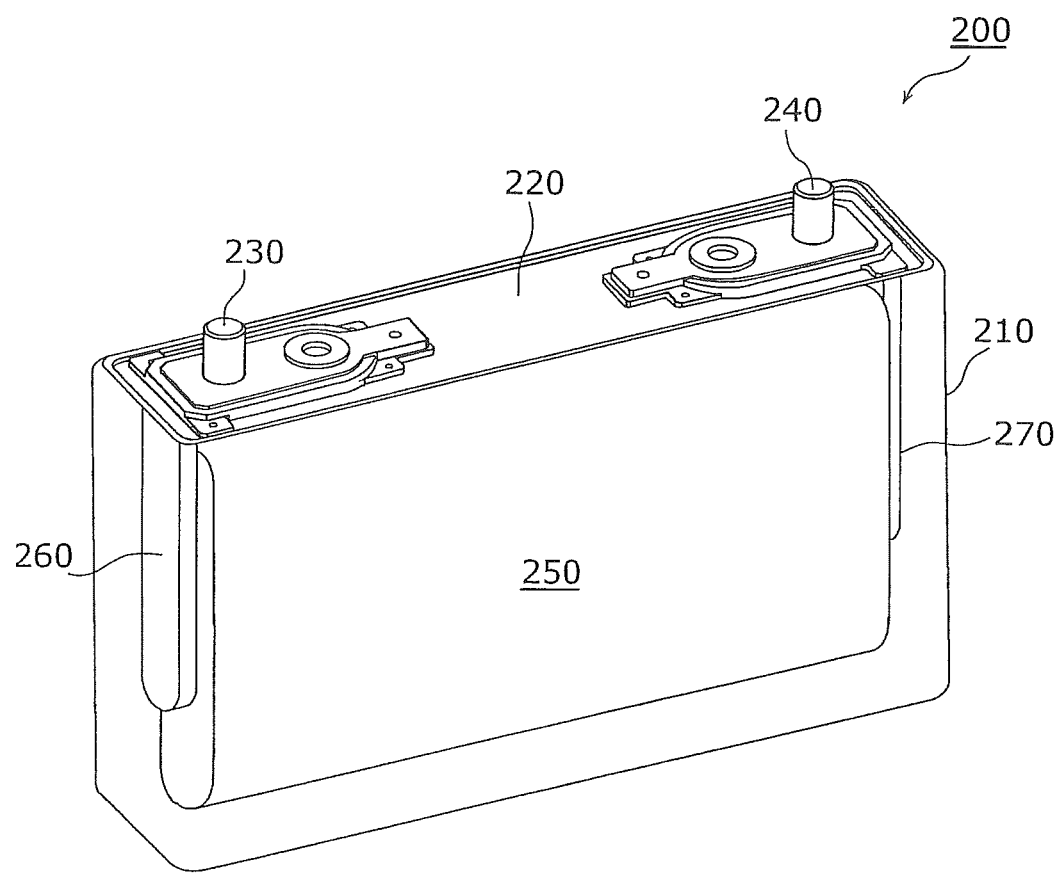
FIG. 4 is a transparent perspective view illustrating the inside of an energy storage device.
Figure 5:
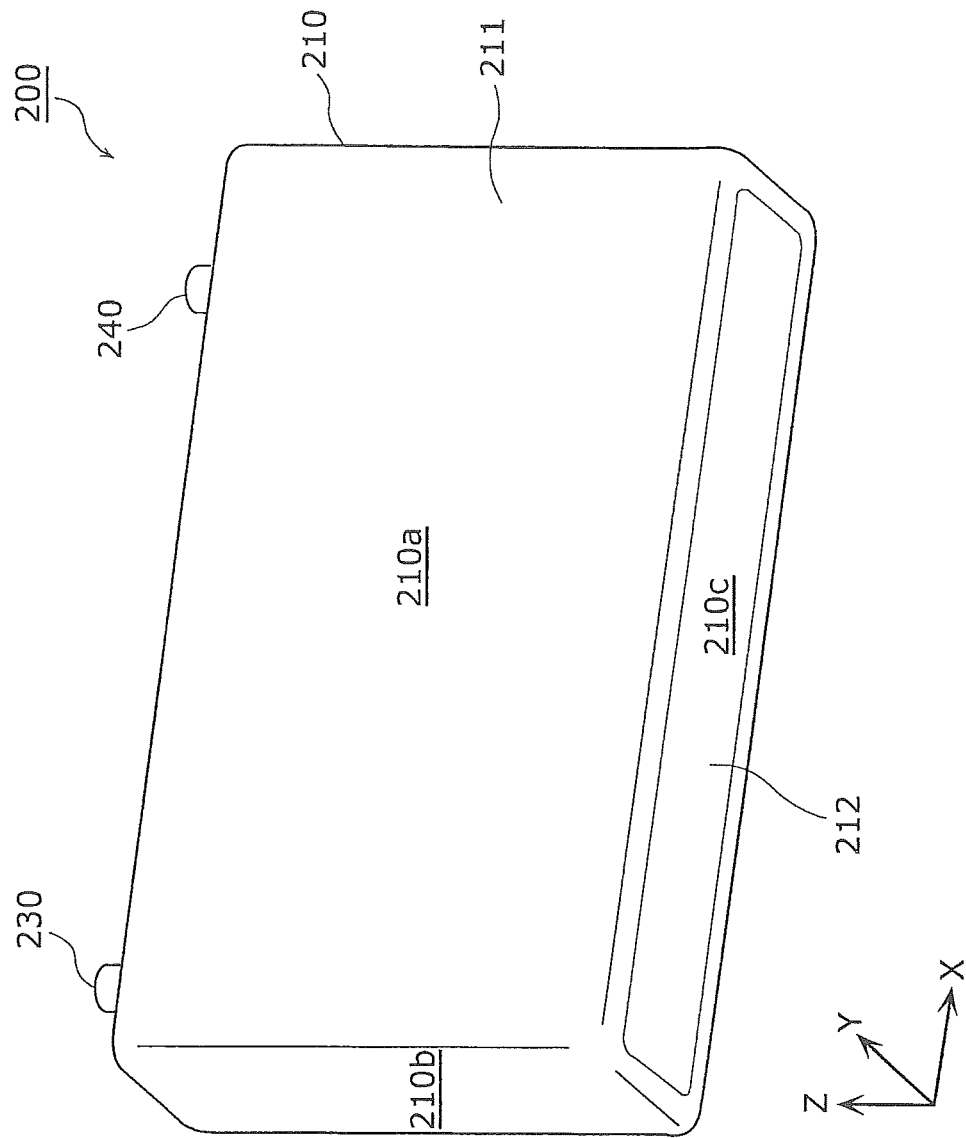
FIG. 5 is an external perspective view of the energy storage device from below.

FIG. 4 is a transparent perspective view illustrating the inside of the energy storage device 200 according to the embodiment of the present invention. FIG. 5 is an external perspective view of the energy storage device 200 from below.

The energy storage device 200 is a secondary battery (battery cell) capable of charging and discharging electricity. More specifically, the energy storage device 200 is a non-aqueous electrolyte secondary battery such as a lithium ion secondary battery. It should be noted that the energy storage device 200 is not limited to a non-aqueous electrolyte secondary battery. The energy storage device 200 may be a secondary battery other than a non-aqueous electrolyte secondary battery, such as a capacitor.

First, as is illustrated in FIG. 4, the energy storage device 200 includes a container 210, the positive terminal 230, and the negative terminal 240. The container 210 includes, as a top wall, a container lid 220. Additionally, an electrode assembly 250, a positive current collector 260, and a negative current collector 270 are arranged in the container 210. It should be noted that even though it is not shown in the drawings, the container 210 contains a liquid such as an electrolyte.

The container 210 is configured of a rectangular, tubular metal chassis main body having a bottom, and a container lid 220, which is metallic and hermetically seals the opening of the chassis main body. Moreover, after insertion of the electrode assembly 250 and such, the inside of the container 210 is sealed by, for example, welding the container lid 220 to the chassis main body. It should be noted that the material used for the container 210 is not particularly limited to a certain material, but is preferably a weldable metal such as stainless steel or aluminum.

As is illustrated in FIG. 5, the container 210 includes a sheet 211 that has insulating properties and covers the energy storage device side surfaces 210a and 210b, and a sheet 212 that has insulating properties and covers the energy storage device bottom surface 210c. Here, the energy storage device side surface 210a is the long side surface of the container 210, the energy storage device side surface 210b is the short side surface of the container 210, and the energy storage device bottom surface 210c is the bottom surface of the container 210.

In other words, the sheet 212 is an insulation sheet that, by covering the energy storage device bottom surface 210c, maintains electrical insulation and protects the energy storage device bottom surface 210c from being scratched. The sheet 211 is an insulation sheet that, by covering the energy storage device side surfaces 210a and 210b, which are the side surfaces adjacent to the energy storage device bottom surface 210c, without covering the energy storage device bottom surface 210c, maintains electrical insulation and protects the energy storage device side surfaces 210a and 210b from being scratched.

With this configuration, a gap is present at the perimeter of the energy storage device bottom surface 210c, at the boundary of the sheet 211 and the sheet 212. It should be noted that the sheet 211 and the sheet 212 are not required to have electrical insulating properties. Even in this case, the sheet 211 and the sheet 212 are effective in preventing scratches.

Returning to FIG. 4, the electrode assembly 250 is a power generating element capable of storing electricity, and includes a positive electrode, a negative electrode, and a separator. More specifically, the electrode assembly 250 is a wound electrode assembly formed by winding, into an oblong shape, a laminate including the negative electrode, the positive electrode, and the separator interposed therebetween. It should be noted that the electrode assembly 250 may be a stacked electrode assembly in which flat electrode plates are layered.

Here, the positive electrode is a long, belt-shaped positive electrode base material foil made of aluminum or an aluminum alloy with a positive electrode active material layer formed on a surface thereof. The negative electrode is a long, belt-shaped negative electrode base material foil made of copper or a copper alloy with a negative electrode active material layer formed on a surface thereof. The separator is a microporous sheet. It should be noted that the positive electrode, the negative electrode, and the separator used in the energy storage device 200 are not particularly different from conventional positive electrodes, negative electrodes, and separators, and so long as the performance of the energy storage device 200 is not inhibited, well-known materials may be used. Moreover, so long as it does not inhibit the performance of the energy storage device 200, the electrolyte (non-aqueous electrolyte) enclosed in the container 210 is not particular limited to a certain type; a variety of electrolytes may be used.

The positive terminal 230 is an electrode terminal that is electrically connected to the positive electrode in the electrode assembly 250 via the positive current collector 260, and the negative terminal 240 is an electrode terminal that is electrically connected to the negative electrode in the electrode assembly 250 via the negative current collector 270. Both the positive terminal 230 and the negative terminal 240 are connected to the container lid 220. In other words, the positive terminal 230 and the negative terminal 240 are metallic electrode terminals for leading electricity stored in the electrode assembly 250 out of the energy storage device 200 and introducing electricity into the energy storage device 200 to be stored in the electrode assembly 250.

More specifically, among the energy storage devices 200 included in the energy storage apparatus 1, the positive terminal 230 of the energy storage device 200 positionally corresponding to the external positive terminal 410 is connected to the external positive terminal 410, and the negative terminal 240 of the same energy storage device 200 is connected to the positive terminal 230 of an adjacent energy storage device 200. Similarly, among the energy storage devices 200 included in the energy storage apparatus 1, the negative terminal 240 of the energy storage device 200 positionally corresponding to the external negative terminal 420 is connected to the external negative terminal 420, and the positive terminal 230 of the same energy storage device 200 is connected to the negative terminal 240 of an adjacent energy storage device 200. The positive terminal 230 or the negative terminal 240 of other energy storage devices 200 are connected to the negative terminal 240 or the positive terminal 230 of an adjacent energy storage device 200.

The positive current collector 260 is a rigid component having conductive properties that is electrically connected to the positive terminal 230 and the positive electrode, and positioned between the positive electrode of the electrode assembly 250 and a side wall of the container 210. It should be noted that, similar to the positive electrode current collector foil of the positive electrode, the positive current collector 260 is made of aluminum. Moreover, the negative current collector 270 is a rigid component having conductive properties that is electrically connected to the negative terminal 240 and the negative electrode of the electrode assembly 250, and positioned between the negative electrode of the electrode assembly 250 and a side wall of the container 210. It should be noted that, similar to the negative electrode current collector foil of the negative electrode, the negative current collector 270 is made of copper.

Next, the case main body 100 of the module case 14 will be described in detail.

Figure 6:
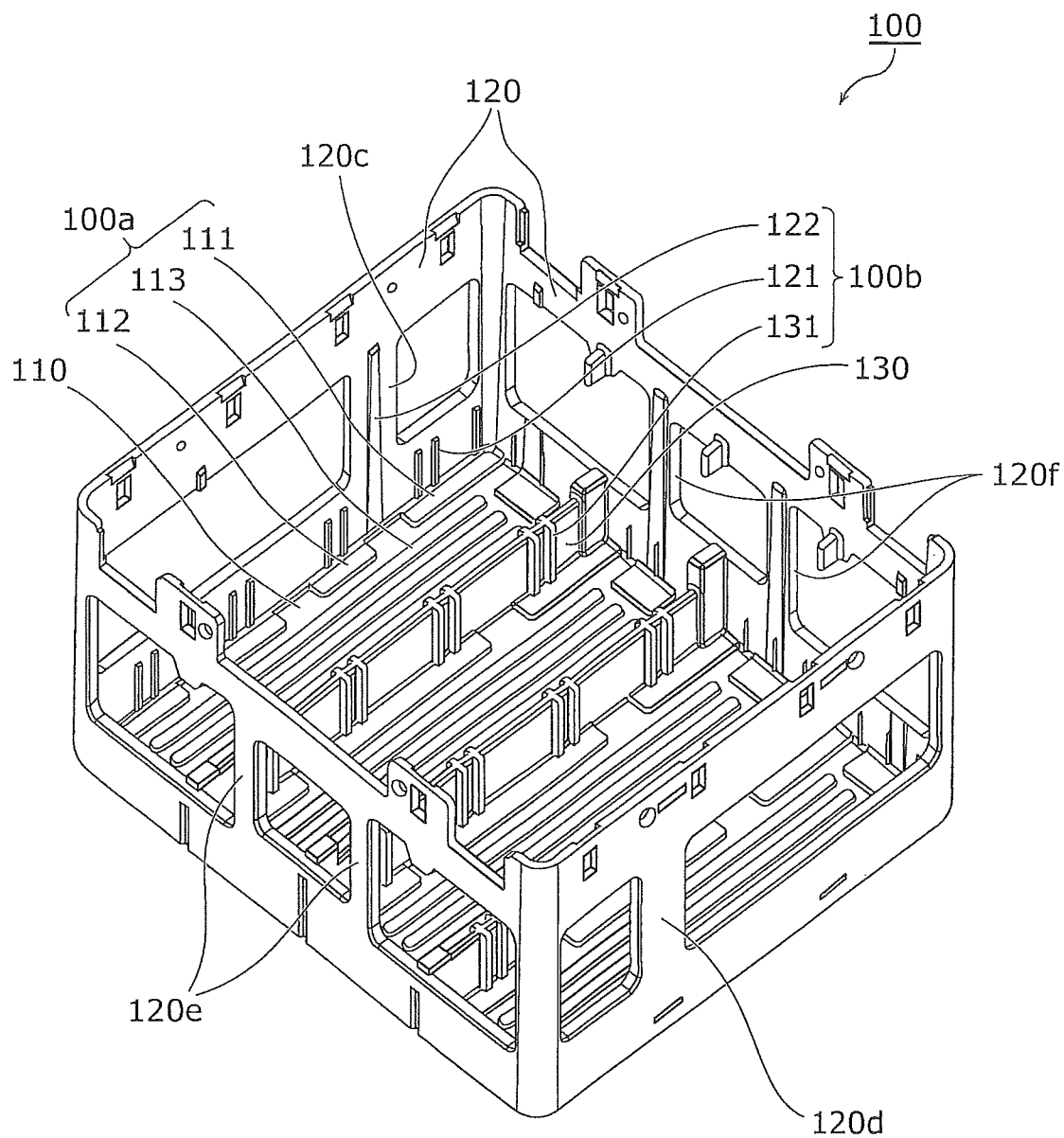
FIG. 6 is a perspective view illustrating the configuration of a case main body.
Figure 7:
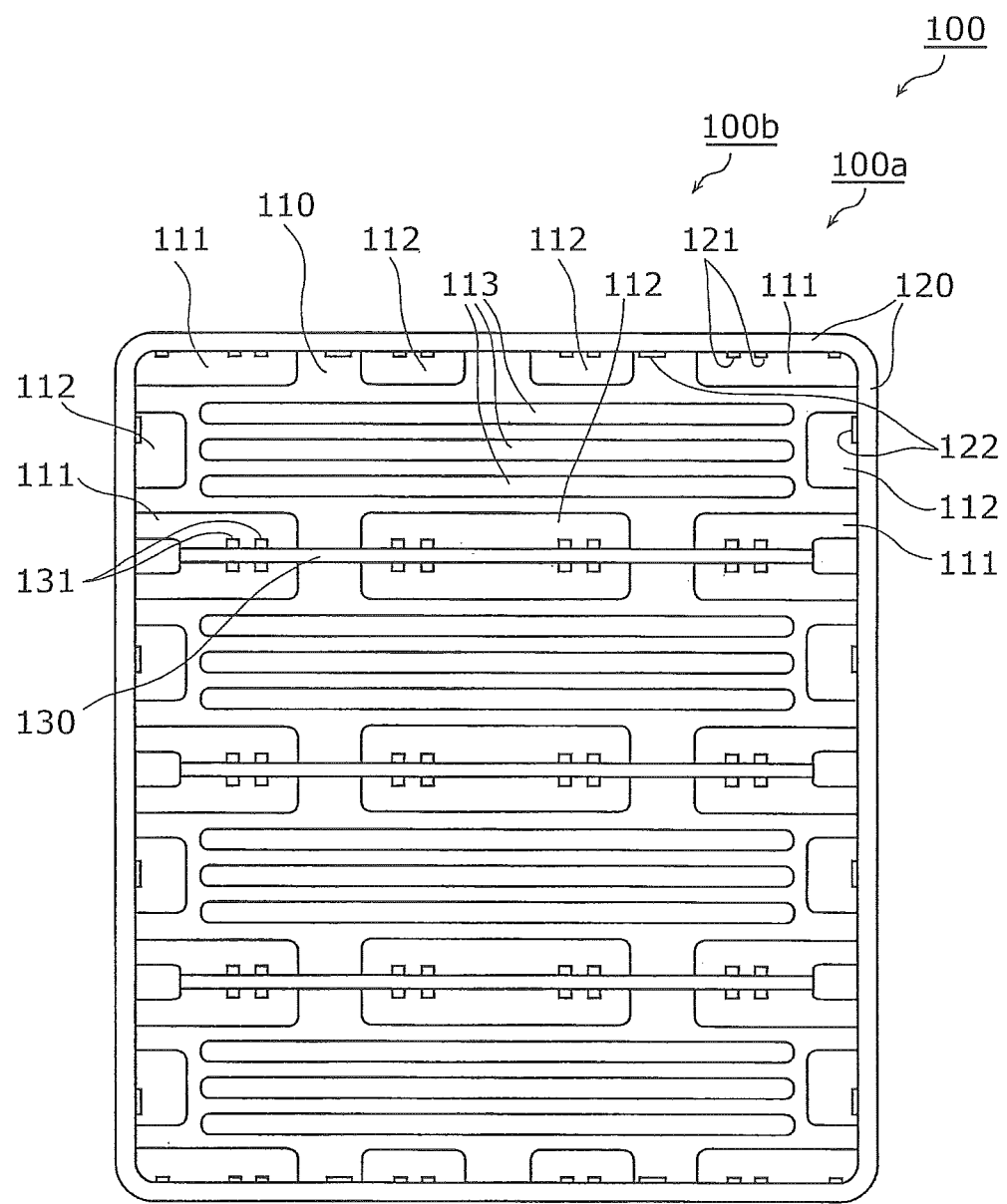
FIG. 7 is a plan view of the case main body.
Figure 8:
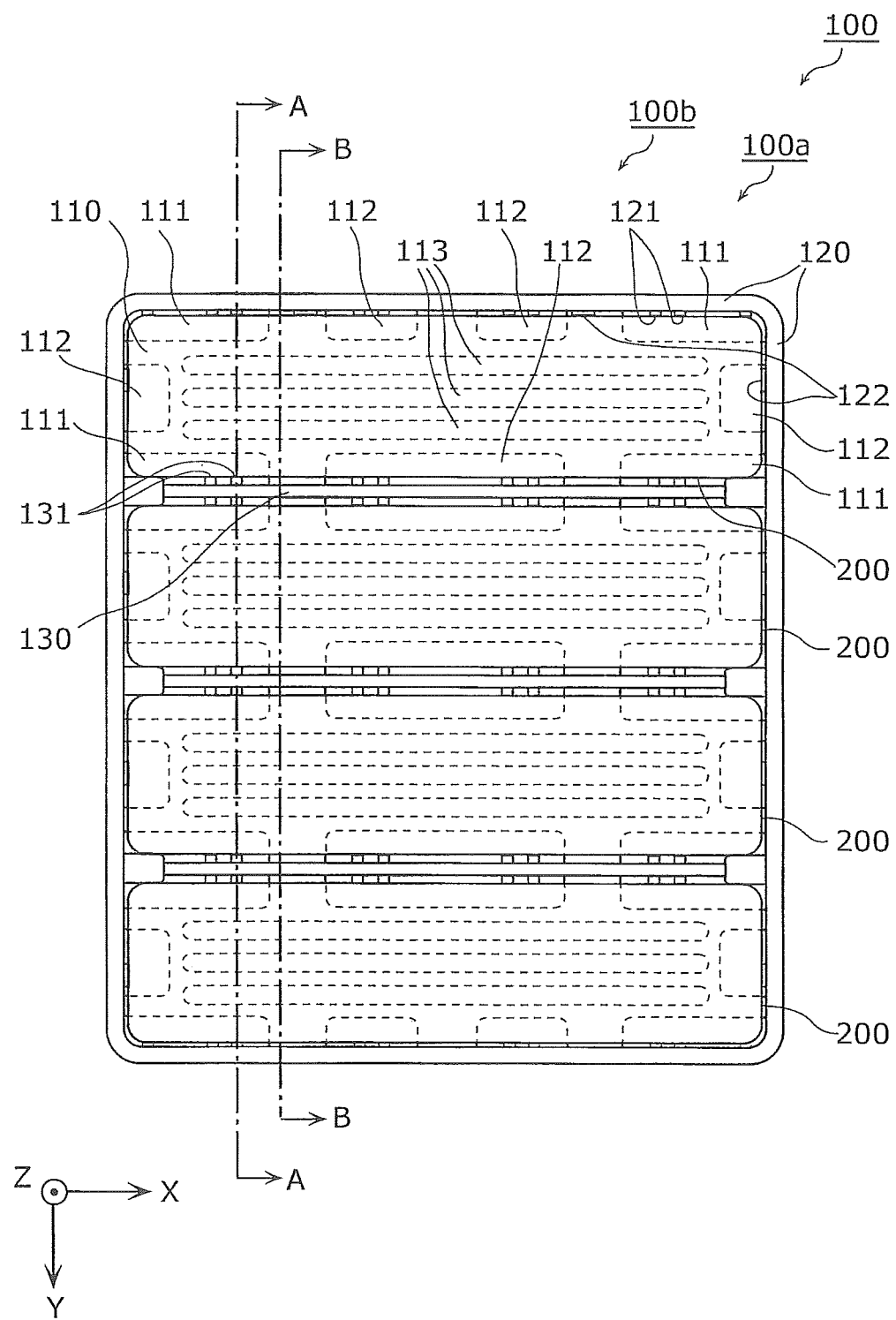
FIG. 8 is a plan view of the case main body from above while the energy storage devices are disposed in the case main body.

FIG. 6 is a perspective view illustrating the configuration of the case main body 100 according to the embodiment of the present invention. FIG. 7 is a plan view of the case main body 100. FIG. 8 is a plan view of the case main body 100 from above while the energy storage devices 200 are disposed in the case main body 100.

Figure 9A:
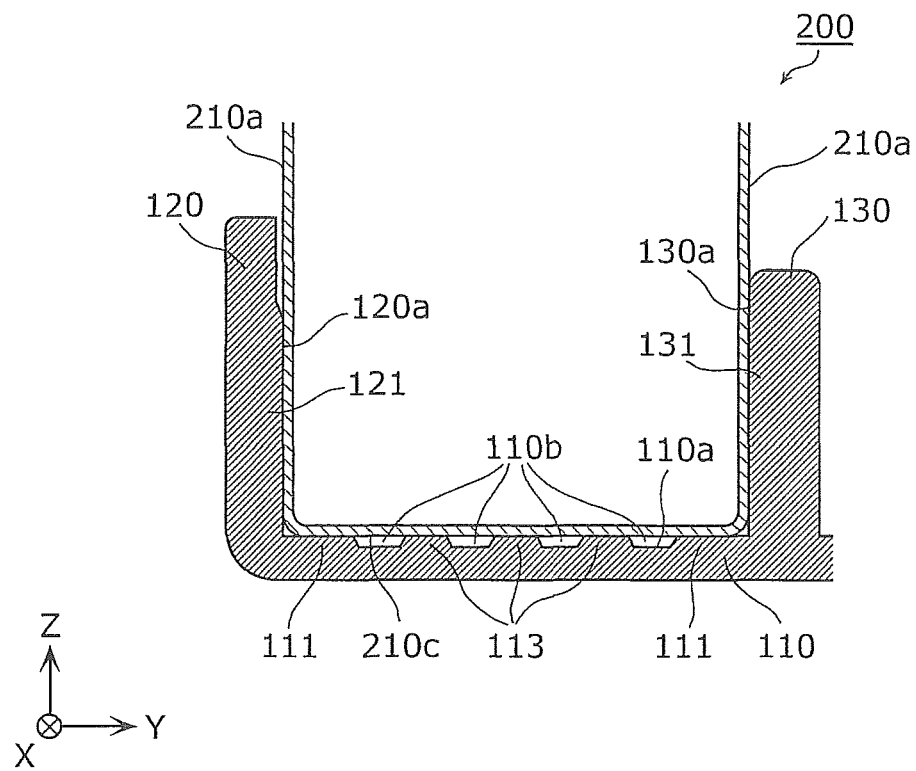
FIG. 9A is an enlarged cross sectional view of the case main body while the energy storage device is disposed in the case main body.
Figure 9B:
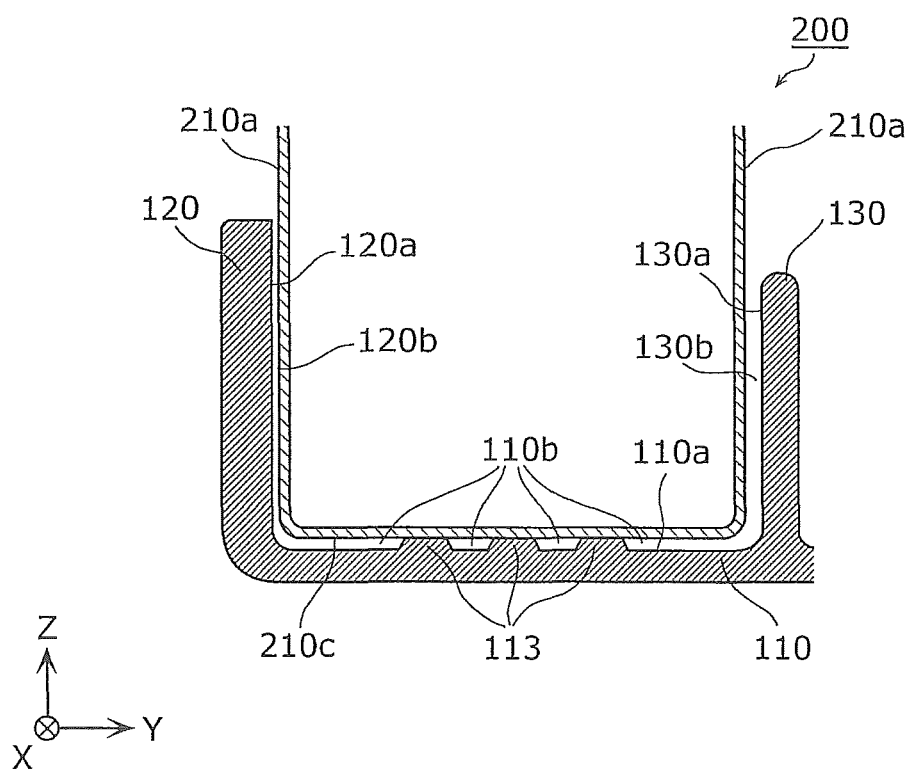
FIG. 9B is an enlarged cross sectional view of the case main body while the energy storage device is disposed in the case main body.

FIG. 9A and FIG. 9B are enlarged cross sectional views of the case main body 100 while the energy storage device 200 is disposed in the case main body 100. More specifically, FIG. 9A is an enlarged cross sectional view of a portion of the case main body 100 and the energy storage device 200 in negative direction of the Y axis, sliced along line A-A shown in FIG. 8. FIG. 9B is an enlarged cross sectional view of a portion of the case main body 100 and the energy storage device 200 in negative direction of the Y axis, sliced along line B-B shown in FIG. 8.

As is illustrated in these drawings, the case main body 100 includes a case bottom portion 110, a case side wall portion 120, and a partition 130, and is a rectangular, tubular component having a bottom and an opening in the upper portion. The energy storage devices 200 are inserted from the opening in the upper portion of the case main body 100 and housed in the case main body 100.

In the embodiment, the energy storage devices 200 are housed in the case main body 100 such that the container lid 220 faces upward (the positive direction of the X axis). In other words, the energy storage devices 200 are housed in the case main body 100 such that the energy storage device bottom surfaces 210c of the energy storage devices 200 are opposed to the case bottom portion 110 and the energy storage device side surfaces 210a and 210b of the energy storage devices 200 are opposed to the case side wall portion 120 and the partitions 130.

The case bottom portion 110 is the bottom surface of the case main body 100, and is a flat, rectangular component. The case side wall portion 120 is a four-cornered tubular component made from four flat, rectangular side walls that cover the four sides of the case bottom portion 110. The partition 130 is a flat, rectangular component for partitioning the energy storage devices 200 disposed in the case main body 100.

Moreover, in order to dissipate heat generated by the energy storage devices 200 to the outside of the case main body 100, a plurality of rectangular openings are formed in the case side wall portion 120 along the inner circumference in a ring. It should be noted that the openings formed in the case side wall portion 120 are not limited to a rectangular shape.

Here, the case side wall portion 120 includes pillars 120c through 120f that partition the plurality of openings. The pillars 120c through 120f are pillar-shaped components that extend in a direction (Z axis) intersecting the direction of alignment (X axis) of the module units 11, 12, and 13.

In other words, each of the pillars 120c through 120f is arranged between adjacent ones of the openings. In other words, each of the pillars 120c through 120f is arranged to divide the openings formed in the case side wall portion 120, and the openings are formed on both sides of each pillar-shaped component of the pillars 120c through 120f.

The pillars 120c and 120d are elongated components formed in, among the four side walls included in the case side wall portion 120 of the module case 14, a pair of side walls opposed to each other. The pillars 120c and 120d formed in the opposing pair of side walls are provided in different positions in the direction of alignment of the module units 11, 12, and 13. In other words, the pillar 120c and the pillar 120d are provided in different positions along the X axis so that the pillars of adjacent module cases 14 do not overlap.

The pillars 120e and 120f are elongated components formed in, among the four side walls included in the case side wall portion 120, the other pair of side walls opposed to each other. The pillar 120e and the pillar 120f are provided in the same position along the Y axis. With this, since the pillars included in adjacent module cases 14 positionally overlap each other, coolant such as air can flow freely in the direction of arrangement of the module units 11, 12, and 13.

It should be noted that in the embodiment, the pillars 120c and 120d each include one pillar-shaped component, and the pillars 120e and 120f each include two pillar-shaped components, but the number of pillar-shaped components is not limited to this example.

Moreover, to more easily guide the heat generated by the energy storage devices 200 to the openings in the case side wall portion 120, the partitions 130 are formed to be shorter in height (Z axis height) than the energy storage devices 200. This also allows coolant such as air to flow freely between adjacent energy storage devices 200 in the direction of alignment (X axis) of the module units 11, 12, and 13.

The case main body 100 moreover includes a first protrusion 100a and a second protrusion 100b.

The first protrusion 100a protrudes from at least one of the energy storage device bottom surface 210c of the energy storage device 200 and the case bottom portion 110 so as to form a space defined by the energy storage device bottom surface 210c and the case bottom portion 110. In the embodiment, the first protrusion 100a protrudes from the case bottom portion 110 and includes, formed on the case bottom portion 110, a corner protrusion 111, a between-corner protrusion 112, and a central protrusion 113.

In other words, as is illustrated in FIG. 9A, the first protrusion 100a (the corner protrusion 111 and the central protrusion 113 in FIG. 9A) protrudes from the first case surface 110a so as to form a first space 110b defined by (i) the energy storage device bottom surface 210c of at least one energy storage device 200 among the one or more energy storage devices 200 disposed in the case main body 100 and (ii) the first case surface 110a.

Here, the first case surface 110a is a surface of the module case 14 that is opposed to the energy storage device bottom surface 210c. In other words, the first case surface 110a is the top surface (surface in the positive direction of the Z axis) of the case bottom portion 110.

Moreover, the first case surface 110a is devoid of an opening such as a through-hole or cut-out portion in a region that corresponds to the energy storage device bottom surface 210c. In other words, an opening is not formed in the region of the case bottom portion 110 directly below the energy storage device bottom surface 210c. It should be noted that an opening may be formed in a region of the case bottom portion 110 that is not directly below the energy storage device bottom surface 210c, but in order to maintain electrical insulation between the energy storage device 200 and the lower coupling component 20, it is preferable that the case bottom portion 110 be completely devoid of any openings.

The corner protrusion 111 is a rectangular protrusion located in positions corresponding to the four corners of the energy storage device bottom surface 210c of the energy storage device 200. In other words, the corner protrusion 111 includes four protrusions per energy storage device 200, and is provided for each and every energy storage device 200 disposed in the case main body 100.

The between-corner protrusion 112 is a rectangular protrusion located between two adjacent corner protrusions 111. In the embodiment, one or two of the between-corner protrusions 112 are formed between two adjacent corner protrusions 111, but three or more may be formed.

The central protrusion 113 is a protrusion located in a position corresponding to the central portion of the energy storage device bottom surface 210c of the energy storage device 200. The central protrusion 113 includes three rod-shaped protrusions per energy storage device 200 that extend along the length of the energy storage device bottom surface 210c (in the X axis), and is provided for each and every energy storage device 200 disposed in the case main body 100. It should be noted that the number of protrusions included in the central protrusion 113 is not limited to three.

It should be noted that the shapes of the corner protrusion 111 and the between-corner protrusion 112 are rectangular when viewed from above (in the Z axis), but the shape thereof is not limited to this example. For example, the corner protrusion 111 and the between-corner protrusion 112 may be circular, elliptical, or oval. Moreover, the shape of the central protrusion 113 is oval when viewed from above (in the Z axis), but the shape thereof is not limited to this example. For example, the central protrusion 113 may be elliptical, circular, or rectangular.

Moreover, the corner protrusion 111, the between-corner protrusion 112, and the central protrusion 113 are formed to have the same height (Z axis height). In other words, while the energy storage device 200 is disposed in the case main body 100, the top surfaces (surface in the positive direction of the Z axis) of the corner protrusion 111, the between-corner protrusion 112, and the central protrusion 113 are formed to be in contact with the energy storage device bottom surface 210c of the energy storage device 200.

It should be noted that in the embodiment, the corner protrusion 111, the between-corner protrusion 112, and the central protrusion 113 are formed integrally with the case bottom portion 110, but one of the corner protrusion 111, the between-corner protrusion 112, or the central protrusion 113 may be formed separately from the case bottom portion 110.

The second protrusion 100b is a protrusion that protrudes from at least one of (i) the energy storage device side surfaces 210a and 210b of the energy storage device 200 and (ii) the case side wall portion 120 or partition 130 so as to form a space defined by the energy storage device side surfaces 210a and 210b and the case side wall portion 120 or the partition 130. In the embodiment, the second protrusion 100b is a protrusion that protrudes from the case side wall portion 120 and the partition 130, and includes side wall protrusions 121 and 122 formed on the case side wall portion 120 and a partition protrusion 131 formed on the partition 130.

In other words, as is illustrated in FIG. 9A and FIG. 9B, the second protrusion 100b (the side wall protrusion 121 and partition protrusion 131 in FIG. 9A and FIG. 9B) protrudes from the second case surfaces 120a and 130a so as to form second spaces 120b and 130b defined by (i) the energy storage device side surfaces 210a and 210b of at least one energy storage device 200 among the one or more energy storage devices 200 disposed in the case main body 100 and (ii) the second case surfaces 120a and 130a.

Here, the second case surfaces 120a and 130a are surfaces of the module case 14 that oppose the energy storage device side surfaces 210a and 210b. In other words, the second case surface 120a is a side surface of the case side wall portion 120, and the second case surface 130a is a side surface of the partition 130.

The first space 110b and the second spaces 120b and 130b are communicated with each other. In other words, the first space 110b and the second spaces 120b and 130b are not closed-off spaces, but are formed to be in communication.

The first space 110b is in communication with the opening 22a of the first vertical wall 22 and the opening 23a of the second vertical wall 23 illustrated in FIG. 2. In other words, the first space 110b and the second spaces 120b and 130b are in communication with the outside of the energy storage apparatus 1 via the opening 22a and the opening 23a.

More specifically, as a result of (i) the middle opening of the three openings partitioned by the pillar 120e formed in the case side wall portion 120 of the module case 14 of the module unit 11 and (ii) the opening 22a formed in the first vertical wall 22 being adjacently arranged, the space in the middle opening and the space in the opening 22a are in communication. Moreover, as a result of (i) the three openings partitioned by the pillar 120f formed in the case side wall portion 120 of the module case 14 of the module unit 13 and (ii) the three openings 23a formed in the second vertical wall 23 being adjacently arranged, the spaces in the three openings and the spaces in the openings 23a are in communication. With this, the first space 110b and the second spaces 120b and 130b are in communication with the spaces in the opening 22a and the opening 23a and in communication with the outside of the energy storage apparatus 1.

The side wall protrusions 121 and 122 are rectangular protrusions formed around the perimeter on the inner surface of the case side wall portion 120. The partition protrusion 131 is a rectangular protrusion formed on both side surfaces of the partition 130. In other words, the side wall protrusions 121 and 122 and the partition protrusion 131 are formed around the entire perimeter of all side surfaces so as to surround all side surfaces of all energy storage devices 200 disposed in the case main body 100.

It should be noted that the side wall protrusions 121 and 122 and the partition protrusion 131 is not limited to a rectangular shape. For example, the side wall protrusions 121 and 122 and the partition protrusion 131 may be cylindrical protrusions, circular truncated protrusions, truncated pyramid protrusions, circular cones, or pyramid shaped protrusions protruding inward relative to the case side wall portion 120.

Moreover, the side wall protrusions 121 and 122 are formed to have the same protruding height (X or Y axis height), and the partition protrusions 131 are formed to have the same protruding height (Y axis height). In other words, while the energy storage devices 200 are disposed in the case main body 100, the side wall protrusions 121 and 122 and the partition protrusion 131 are formed so that the end surfaces thereof are in contact with the energy storage device side surface 210*a* or the 210*b* of the energy storage device 200.

It should be noted that in the embodiment, the side wall protrusion 121 and 122 are formed integrally with the case side wall portion 120, but one of the side wall protrusions 121 or 122 may be formed separately from the case side wall portion 120. Moreover, in the embodiment, the partition protrusion 131 is formed integrally with the partition 130, but the partition protrusion 131 may be formed separately from the partition 130.

Figure 10:
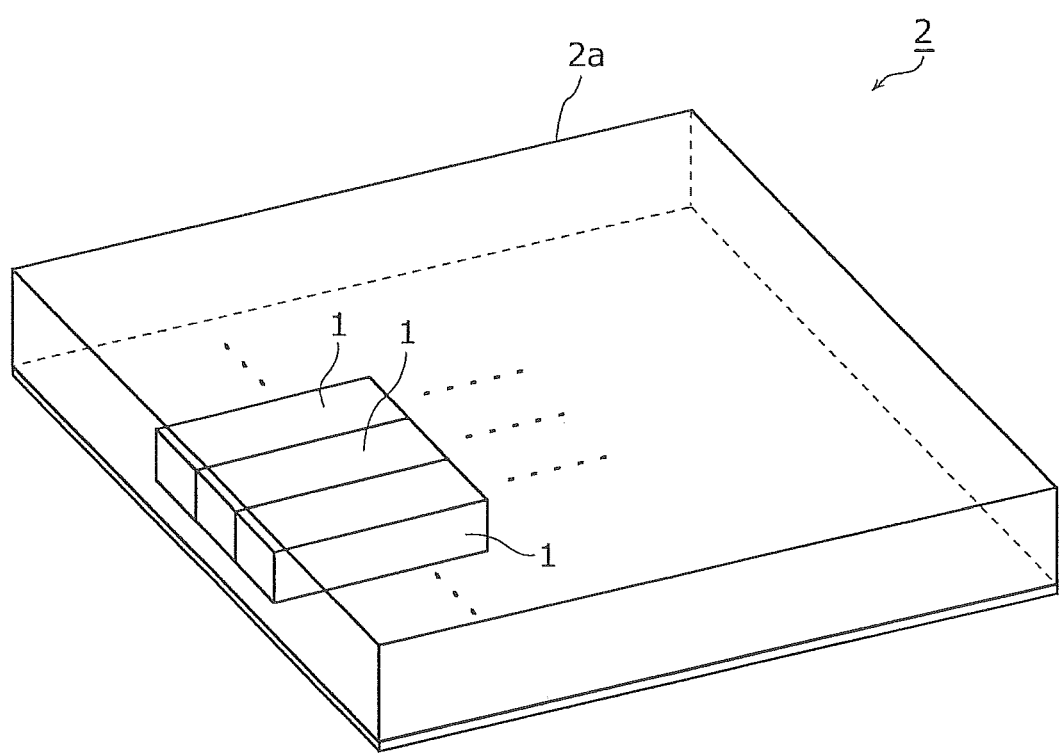
FIG. 10 is a perspective view illustrating the configuration of an energy storage pack including the energy storage apparatus.
Figure 10:
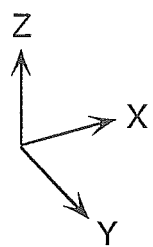

Next, an application example of the energy storage apparatus 1 will be given. FIG. 10 is a perspective view illustrating the configuration of an energy storage pack 2 including the energy storage apparatus 1 according to the embodiment of the present invention.

As is illustrated in FIG. 10, the energy storage pack 2 is a large power source apparatus in which a plurality of energy storage apparatuses (for example, ten to forty) are arranged in an array. The energy storage pack 2 is a battery pack used to store energy and/or used as a power source, for example. The energy storage pack 2 includes a plurality of the energy storage apparatuses 1 and a pack case 2*a* that houses the plurality of energy storage apparatuses 1.

The external positive terminals 410 and external negative terminals 420 of adjacent ones of the energy storage apparatuses 1 are electrically connected together to form the high-voltage energy storage pack 2. It should be noted that the number of energy storage apparatuses 1 included in the energy storage pack 2 is not particularly limited to a given number.

As described above, the energy storage apparatus 1 according to the embodiment of the present invention includes the first protrusion 100*a* which protrudes from the first case surface 110*a* so as to form the first space 110*b* defined by the energy storage device bottom surface 210*c* of the energy storage device 200 and the first case surface 110*a* of the module case 14. Since this configuration allows the heat generated by the energy storage devices 200 to be dissipated via the first space 110*b* formed by the first protrusion 100*a*, it is possible to efficiently cool the energy storage devices 200 disposed in the module case 14.

As such, since the energy storage devices 200 can be cooled, the energy storage apparatus 1 can be cooled without cooling the energy storage apparatus 1 externally inside the pack case 2*a* of the energy storage pack 2 illustrated in FIG. 10.

Moreover, since the side surfaces of the energy storage device 200 are covered by the sheet 211, the heat from the energy storage device 200 is more easily dissipated from the bottom surface than the side surfaces of the energy storage device 200. This makes it possible to efficiently cool the energy storage devices 200 by dissipating heat via the first space 110*b* formed toward the bottom surface of the energy storage devices 200.

Moreover, since the corner protrusion 111 is formed in positions corresponding to the four corners of the energy storage device bottom surface 210*c*, when the energy storage devices 200 are disposed in the module case 14, it is possible to support each energy storage device 200 at the four corners of the energy storage device bottom surface 210*c*. This makes it possible to securely mount the energy storage devices 200 in the module case 14.

Moreover, since the central protrusion 113 is formed in a position corresponding to the central portion of the energy storage device bottom surface 210*c*, when the energy storage devices 200 are disposed in the module case 14, it is possible to support each energy storage device 200 in the central portion of the energy storage device bottom surface 210*c*. This makes it possible to keep the central portion of the energy storage device bottom surface 210*c* from bulging in the module case 14 and securely mount the energy storage devices 200 in the module case 14.

Moreover, the energy storage apparatus 1 includes the second protrusion 100*b* which protrudes from the second case surfaces 120*a* and 130*a* so as to form the second spaces 120*b* and 130*b* defined by the energy storage device side surfaces 210*a* and 210*b* of the energy storage device 200 and the second case surfaces 120*a* and 130*a* of the module case 14. Since this configuration allows the heat generated by the energy storage devices 200 to be dissipated via the second spaces 120*b* and 130*b* formed by the second protrusion 100*b*, it is possible to efficiently cool the energy storage devices 200 disposed in the module case 14.

Moreover, since the first space 110*b* on the energy storage device bottom surface 210*c* side and the second spaces 120*b* and 130*b* on the energy storage device side surfaces 210*a* and 210*b* sides are connected, the heat generated by the energy storage devices 200 is dissipated via the first space 110*b* and the second spaces 120*b* and 130*b*. This makes it possible to efficiently cool the energy storage devices 200 and keep the heat from pooling between each energy storage device 200 and the module case 14.

Moreover, since a through-hole is not formed in the portion of the module case 14 opposed to the energy storage device bottom surface 210*c*, even if the module case 14 is mounted on a conductive material, it is possible to maintain electrical insulation between the energy storage devices 200 and the conductive material. In other words, it is possible to efficiently cool the energy storage device 200 even if the module case 14 has a configuration devoid of a through-hole in order to prevent electrical shorting between the energy storage devices 200 and the conductive material.

Moreover, the energy storage apparatus 1 includes the conductive lower coupling component 20, which couples the module units 11, 12, and 13 and on which the module case 14 is mounted, but since a through-hole is not formed in the portion of the module case 14 opposed to the energy storage device bottom surface 210*c*, it is possible to maintain electrical insulation between the energy storage devices 200 and the lower coupling component 20. In other words, even in a configuration in which the module case 14 is required to be mounted on the conductive lower coupling component 20 because electrically insulating the lower coupling component 20 with a coating is difficult, it is possible to both prevent electrical shorting between the energy storage devices 200 and the lower coupling component 20 and efficiently cool the energy storage devices 200.

Moreover, by mounting the module units 11, 12, and 13 on the bottom portion 21 of the lower coupling component 20, which is a plate-like member, it is possible to collectively dispose the module units 11, 12, and 13, and possible freely introduce coolant that cools the module units 11, 12, and 13.

Additionally, it is possible to easily connect the module units 11, 12, and 13 in the energy storage apparatus 1 by electrically connecting adjacent module units together.

Moreover, since the module units 11, 12, and 13 and the energy storage devices 200 are mutually aligned in orthogonal directions, it is possible to introduce coolant between the energy storage devices 200 by introducing the coolant in the direction of alignment of the module units 11, 12, and 13.

Moreover, the first vertical wall 22 and the second vertical wall 23 are provided for fixing the module units 11, 12, and 13 to the bottom portion 21 of the lower coupling component 20, which is a plate-like member, but when coolant flows in the alignment direction of the module units 11, 12, and 13, there is concern that the flow of the coolant will be blocked by the first vertical wall 22 and the second vertical wall 23. As such, by providing, in the first vertical wall 22 and the second vertical wall 23, the openings 22a and 23b which are in communication with the first space 110b, when the coolant flows in the direction of alignment of the module units 11, 12, and 13, the coolant can be introduced into and expelled from the first space 110b through the openings 22a and 23a.

Moreover, since the energy storage apparatus 1 includes the cooling apparatus 40 that introduces the coolant into each of the module cases 14, heat pooled in the module units 11, 12, and 13 can be dissipated and the module units 11, 12, and 13 can be efficiently cooled.

In other words, since the cooling apparatus 40 causes the coolant to flow in the vicinity of the second protrusion 100b, the heat flowing from the first space 110 through the second spaces 120b and 130b is carried by the coolant, thereby improving the heat dissipating capability.

Moreover, disposing the cooling apparatus 40 in a position opposed to the module unit 13 situated at the end in the direction of alignment of the module units 11, 12, and 13 makes it possible for the coolant to flow in this direction of alignment, and as such, the module units 11, 12, and 13 can be cooled by flow of the coolant therethrough.

Moreover, the bigger the opening is in the case side wall portion 120 of the module case 14, the easier heat from the energy storage devices 200 can escape the module case 14. However, large openings also reduce the strength of the module case 14. Since the case side wall portion 120 of the module case 14 includes the pillars 120c through 120f, the strength of the module case 14 can be increased.

Moreover, if the pillars 120c and 120d provided on a pair of side walls included in the case side wall portion 120 of the module case 14 are arranged in the same positions in the direction of alignment of the module units 11, 12, and 13, when two module cases 14 are adjacently arranged, the pillars overlap each other and block the flow of coolant in the direction of alignment. As such, by providing the pillar 120c and the pillar 120d in different positions in the above-described direction of alignment, neither the pillar 120c nor the pillar 120d block the flow of coolant in this direction of alignment, and the coolant can flow freely.

(First Modified Embodiment)

Figure 11:
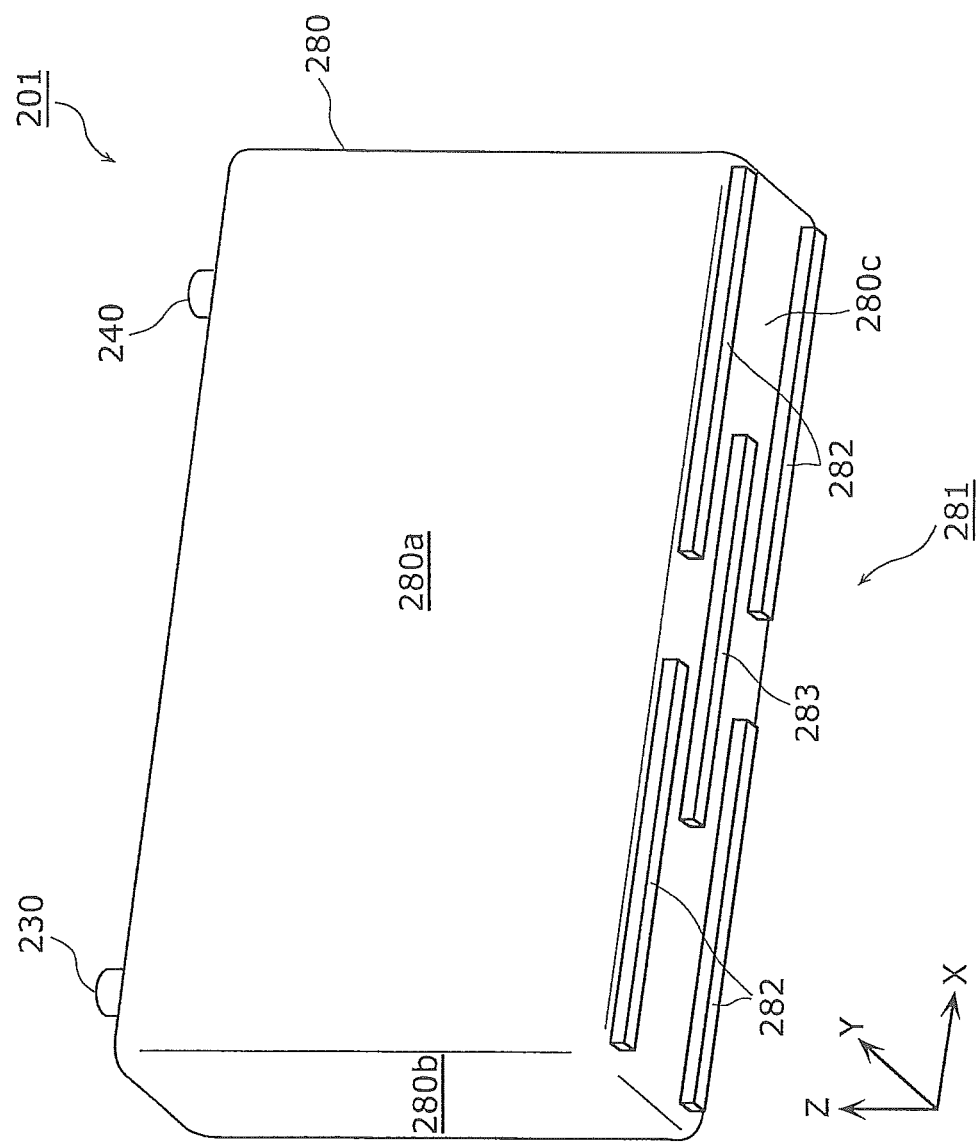
FIG. 11 is an external perspective view of an energy storage device according to a first modified embodiment of the present invention.
Figure 12A:
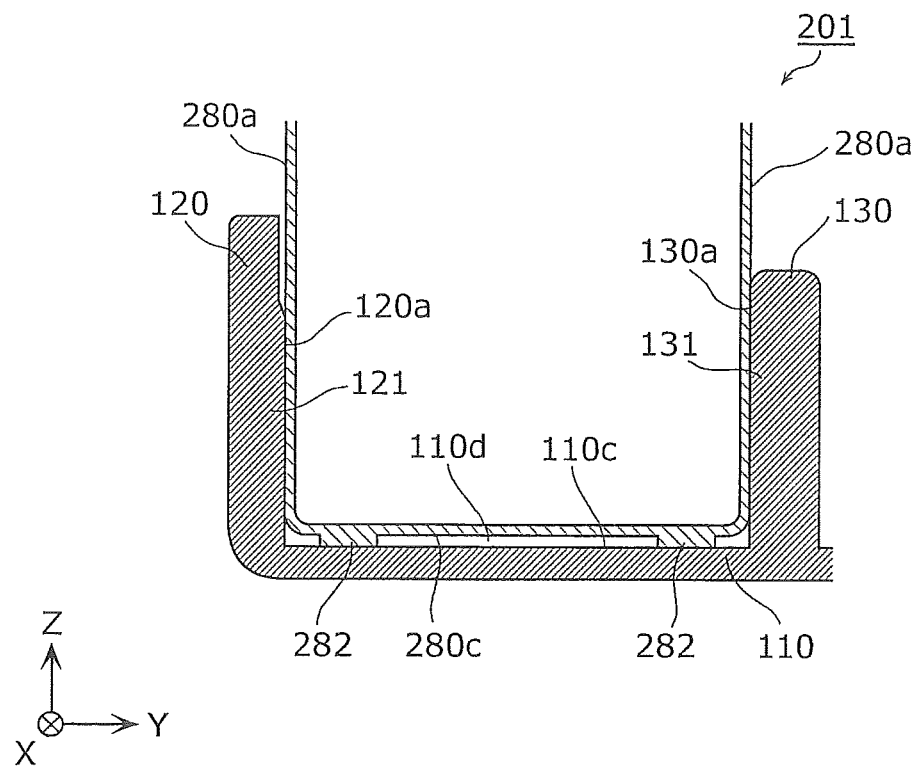
FIG. 12A is an enlarged cross sectional view of a case main body according to the first modified embodiment while the energy storage device is disposed in the case main body.
Figure 12B:
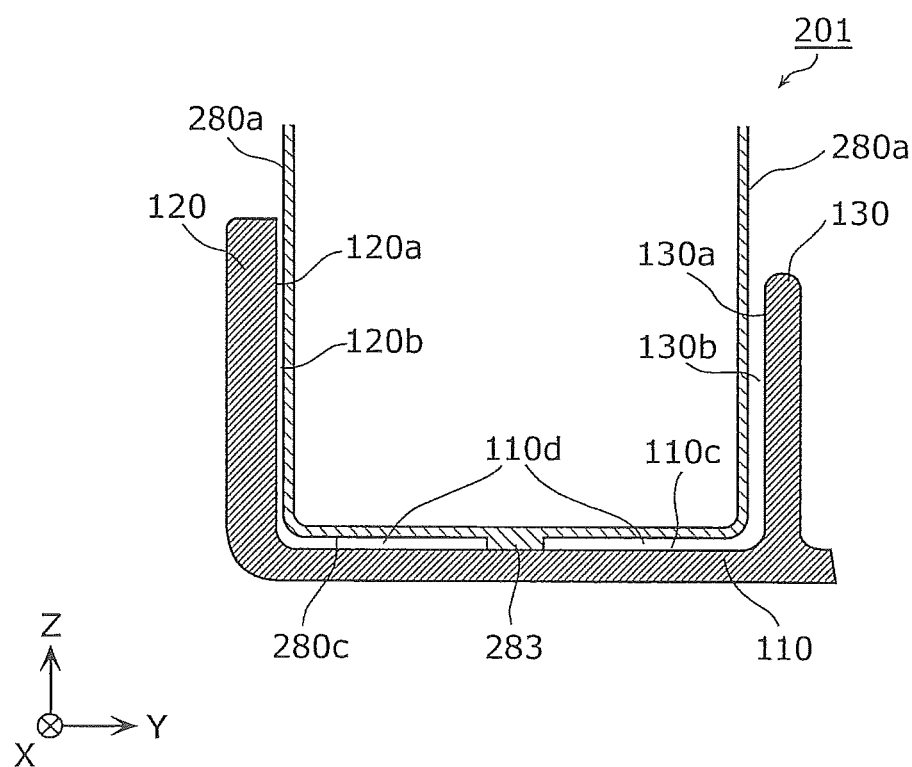
FIG. 12B is an enlarged cross sectional view of the case main body according to the first modified embodiment while the energy storage device is disposed in the case main body.

Next, the first modified embodiment will be described. FIG. 11 is an external perspective view of an energy storage device 201 according to the first modified embodiment of the present invention. FIG. 12A and FIG. 12B are enlarged cross sectional views of the case main body according to the first modified embodiment while the energy storage device 201 is disposed in the case main body. More specifically, FIG. 12A corresponds to FIG. 9A according to the above embodiment, and FIG. 12B corresponds to FIG. 9B according to the above embodiment.

As is illustrated in FIG. 11, the energy storage device 201 includes, instead of the container 210 of the energy storage device 200 according to the above embodiment, a container 280. The container 280 includes energy storage device side surfaces 280a and 280b and an energy storage device bottom surface 280c. A first protrusion 281 is formed on the energy storage device bottom surface 280c. In other words, the container 280 has a configuration in which the protrusions are formed on the energy storage device bottom surface 210c of the container 210 of the energy storage device 200 according to the above embodiment.

It should be noted that other configurations of the energy storage device 201, such as the inclusion of the insulating sheet covering the energy storage device side surfaces 280a and 280b and the inclusion of the insulating sheet covering the energy storage device bottom surface 280c in the container 280, for example, are the same as the energy storage device 200 according to the above embodiment, and as such, descriptions thereof are omitted.

The first protrusion 281 includes a corner protrusion 282 and a central protrusion 283 that are protrusions which protrude from the energy storage device bottom surface 280c of the energy storage device 201 so as to form a space defined by the energy storage device bottom surface 280c and the case bottom portion 110.

In other words, as is illustrated in FIG. 12A and FIG. 12B, the first protrusion 281 (the corner protrusion 282 and the central protrusion 283 in FIG. 12A and FIG. 12B) protrudes from the energy storage device bottom surface 280c of at least one energy storage device 201 among the one or more energy storage devices 201 disposed in the case main body so as to form the first space 110d defined by the energy storage device bottom surface 280c and the first case surface 110c. Here, the first case surface 110c is a surface of the module case that is opposed to the energy storage device bottom surface 280c.

The corner protrusion 282 is a rod-shaped protrusion located in positions corresponding to the four corners of the energy storage device bottom surface 280c of the energy storage device 201. In other words, the corner protrusion 282 includes four protrusions per energy storage device 201, and is provided for each and every energy storage device 201 disposed in the case main body. It should be noted that the shape of the corner protrusion 282 is not limited to a rod shape.

The central protrusion 283 is a protrusion located in a position corresponding to the central portion of the energy storage device bottom surface 280c of the energy storage device 201. The central protrusion 283 includes three rod-shaped protrusions per energy storage device 201 that extend along the length of the energy storage device bottom surface 280c (in the X axis), and is provided for each and every energy storage device 201 disposed in the case main body. It should be noted that the central protrusion 283 may include two or more protrusions, and the shape thereof is not limited to a rod shape.

Moreover, the corner protrusion 282 and the central protrusion 283 are formed to have the same height (Z axis height). In other words, while the energy storage device 201 is disposed in the case main body, the corner protrusion 282 and the central protrusion 283 are formed such that the bottom surfaces (the surface in the negative direction of the Z axis) thereof are in contact with the first case surface 110c of the case bottom portion 110.

It should be noted that in the first modified embodiment, the corner protrusion 282 and the central protrusion 283 are formed integrally with the container 280, but one of the corner protrusion 282 or the central protrusion 283 may be formed separately from the container 280.

As described above, the energy storage apparatus according to the first modified embodiment of the present invention includes the first protrusion 281 that protrudes from the energy storage device bottom surface 280c of the energy storage device 201 so as to form the first space 110 defined by the energy storage device bottom surface 280c and the first case surface 110c. Since this configuration allows the heat generated by the energy storage devices 201 to be dissipated via the first space 110d formed by the first protrusion 281, it is possible to efficiently cool the energy storage devices 201 disposed in the module case.

(Second Modified Embodiment)

Figure 13:
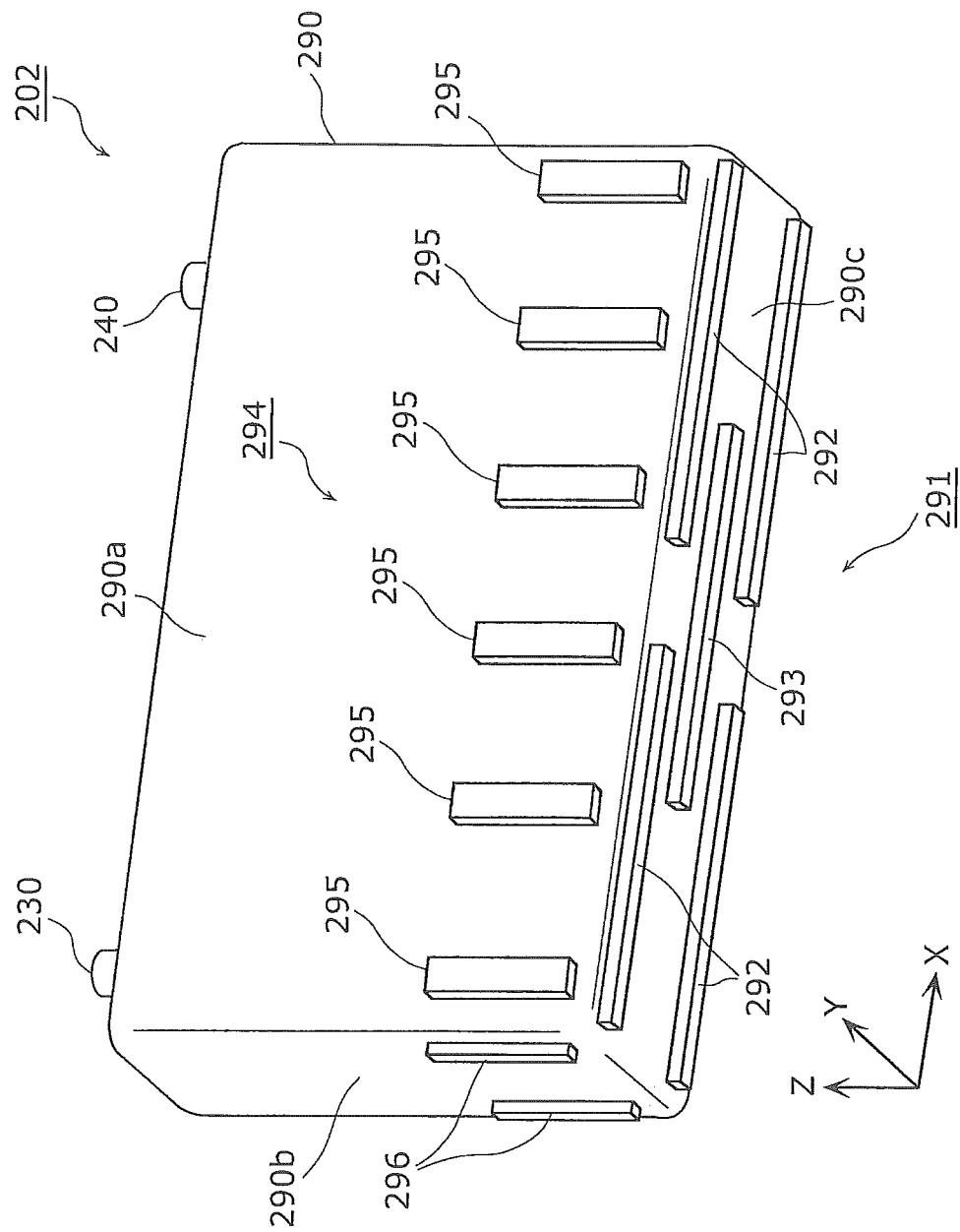
FIG. 13 is an external perspective view of an energy storage device according to a second modified embodiment of the present invention.

Next, the second modified embodiment will be described. FIG. 13 is an external perspective view of an energy storage device 202 according to the second modified embodiment of the present invention.

As is illustrated in FIG. 13, the energy storage device 202 includes, instead of the container 280 of the energy storage device 201 according to the above first modified embodiment, a container 290. The container 290 includes energy storage device side surfaces 290a and 290b and an energy storage device bottom surface 290c. Furthermore, a first protrusion 291 is formed on the energy storage device bottom surface 290c and a second protrusion 294 is formed on the energy storage device side surfaces 290a and 290b. In other words, the container 290 has a configuration in which the protrusions are formed on the energy storage device side surfaces 280a and 280b of the container 280 of the energy storage device 201 according to the above first modified embodiment.

The first protrusion 291 includes a corner protrusion 292 and a central protrusion 293 that are protrusions which protrude from the energy storage device bottom surface 290c so as to form a space defined by the energy storage device bottom surface 290c of the energy storage device 202 and the case bottom portion 110. The first protrusion 291 (the corner protrusion 292 and the central protrusion 293) is the same as the corner protrusion 282 and the central protrusion 283 according to the first modified embodiment, and as such, a detailed description thereof is omitted. Moreover, other configurations of the energy storage device 202 are the same as the energy storage device according to the above embodiment or the above first modified embodiment, and as such, detailed descriptions of those are omitted as well.

The second protrusion 294 is a protrusion that protrudes from the energy storage device side surfaces 290a and 290b of the energy storage device 202 so as to form a space defined by the energy storage device side surfaces 290a and 290b and the case side wall portion 120 or the partition 130.

In other words, the second protrusion 294 protrudes from the energy storage device side surfaces 290a and 290b of at least one energy storage device 202 among the one or more energy storage devices 202 disposed in the case main body so as to form the second space defined by (i) the energy storage device side surfaces 290a and 290b and (ii) the second case surface, which is a surface of the module case opposed to the energy storage device side surfaces 290a or 290b.

Moreover, the second protrusion 294 includes a rectangular long-side-surface protrusion 295 that protrudes from the energy storage device side surface 290a and a rectangular short-side-surface protrusion 296 that protrudes from the energy storage device side surface 290b. In other words, the second protrusion 294 includes a plurality of the long-side-surface protrusions 295 and the short-side-surface protrusions 296 formed around the entire circumference of the energy storage device side surfaces 290a and 290b. It should be noted that the shape and number of the long-side-surface protrusions 295 and the short-side-surface protrusions 296 are not limited to the shape and number shown in FIG. 13.

Moreover, the long-side-surface protrusions 295 are formed to have the same protruding height (Y axis height), and the short-side-surface protrusions 296 are formed to have the same protruding height (X axis height). In other words, while the energy storage devices 202 are disposed in the case main body, the long-side-surface protrusions 295 and the short-side-surface protrusions 296 are formed so the that the end surfaces thereof are in contact with the case side wall portion 120 or the partition 130.

It should be noted that the long-side-surface protrusions 295 and the short-side-surface protrusions 296 may be formed integrally with the container 290. Alternatively, one of the long-side-surface protrusions 295 or the short-side-surface protrusions 296 may be formed separately from the container 290.

As described above, the energy storage apparatus according to the second modified embodiment of the present invention further includes the second protrusion 294 that protrudes from the energy storage device side surfaces 290a and 290b of the energy storage device 202 so as to form the second space defined by the energy storage device side surfaces 290a and 290b and the second case surface of the module case. Since this configuration allows the heat generated by the energy storage devices 202 to be dissipated via the second space formed by the second protrusion 294, it is possible to efficiently cool the energy storage devices 202 disposed in the module case.

Hereinbefore, the energy storage apparatus has been described based on the exemplary embodiment and modified embodiments thereof according to the present invention, but the scope of the present invention is not limited thereto. In other words, all aspects of the embodiment and modified embodiments thereof disclosed herein are examples, and are not intended to be limiting. Equivalents of the Claims and various modifications are intended to be included in the above which do not depart from the principles and spirit of the inventive concept, the scope of which is defined in the appended Claims and not the above-described exemplary embodiment. Various modifications resulting from arbitrary combinations of the exemplary embodiment and the modified embodiments are intended to be included within the scope of the present invention.

For example, in the above embodiment and modified embodiments, the energy storage apparatus includes the cooling apparatus 40, but the energy storage apparatus may have a configuration which does not include the cooling apparatus 40. Moreover, the energy storage apparatus includes the lower coupling component 20 and the upper coupling component 30, but the energy storage apparatus may have a configuration which does not include the lower coupling component 20 and the upper coupling component 30.

Moreover, in the above embodiment and modified embodiments, the lower coupling component 20 and the upper coupling component 30 are made of a conductive material, but the lower coupling component 20 and the upper coupling component 30 may be made from an insulating material such as resin. In this case, the region of the module case corresponding to the energy storage device bottom surface of the first case surface may include a through-hole.

Moreover, in the above embodiment and modified embodiments, the energy storage device includes sheets that cover the side surfaces and the bottom surface, but the energy storage device may have a configuration which does not include the sheets.

Moreover, in the above embodiment and modified embodiments, the first protrusion includes a corner protrusion disposed at positions corresponding to the four corners of the energy storage device bottom surface, but the first protrusion may include protrusions disposed at positions corresponding to two or three of the four corners of the energy storage device bottom surface. With this, it is possible to support the energy storage device in at least two locations of the four corners of the energy storage device bottom surface, and as such, it is possible to securely mount the energy storage device in the module case. Moreover, the first protrusion includes the central protrusion disposed at a position corresponding to the central portion of the energy storage device bottom surface, but the first protrusion may have a configuration which does not include the central protrusion.

Moreover, in the above embodiment and modified embodiments, the energy storage apparatus has a configuration in which the first space formed by the first protrusion and the second space formed by the second protrusion are communicated with each other, but the energy storage apparatus may have a configuration in which the first space and the second space are not communicated with each other. Moreover, the energy storage apparatus includes the second protrusion, but the energy storage apparatus may have a configuration that does not include the second protrusion.

Moreover, in the above embodiment and modified embodiments, the module case is a container that houses the energy storage devices, but the module case may be a battery cell spacer that can hold the energy storage devices.

Moreover, in the above embodiment and modified embodiments, the energy storage device bottom surface is the surface on the opposite side that the electrode terminals are on, but the energy storage device may be laid on its side where the short side of the energy storage device is opposed to the bottom surface of the module case. In this case, the energy storage device bottom surface is the short side of the energy storage device. Additionally, in this case, the energy storage device may have a configuration in which the short side is not covered by the sheet and surfaces of the energy storage device other than the short side are covered by the sheet.

The invention claimed is:

1. An energy storage apparatus, comprising:
a module unit including one or more energy storage devices;
a module ease holding the one or more energy storage devices, the module case including a first case surface and a second case surface extending vertical to the first case surface; and
a first protrusion that protrudes from the first case surface of the module case so as to form a first space defined by the energy storage device bottom surface and a part of the first case surface, the energy storage device bottom surface including a bottom surface of at least one of the one or more energy storage devices, the first case surface being opposed to the energy storage device bottom surface, another part of the first case surface being in contact with the energy storage device bottom surface,
wherein the first case surface, the first protrusion, and the second case surface are integrally formed as one piece, and
wherein the first protrusion includes a central protrusion disposed at a position on the first case surface that corresponds to a central portion of the energy storage device bottom surface, the central protrusion being horizontally aligned, and longitudinally extending, along a longitudinal direction of the energy storage device bottom surface.

2. The energy storage apparatus according to claim 1, wherein the first protrusion further includes other protrusions disposed at positions corresponding to at least two of four corners of the energy storage device bottom surface.

3. The energy storage apparatus according to claim 1, wherein the first protrusion includes a central protrusion disposed at a position corresponding to a central portion of the energy storage device bottom surface.

4. The energy storage apparatus according to claim 1, further comprising a second protrusion that protrudes from at least one of an energy storage device side surface and the second case surface of the module case so as to form a second space defined by the energy storage device side surface and the second case surface, the energy storage device side surface including a side surface of the at least one of the one or more energy storage devices, the second case surface being opposed to the energy storage device side surface.

5. The energy storage apparatus according to claim 4, wherein the first space and the second space are communicated with each other.

6. The energy storage apparatus according to claim 1, wherein the first case surface is devoid of a through-hole in a region corresponding to the energy storage device bottom surface.

7. The energy storage apparatus according to claim 1, wherein the at least one of the one or more energy storage devices including the energy storage device bottom surface includes a sheet that covers side surfaces, the side surfaces bordering the energy storage device bottom surface.

8. The energy storage apparatus according to claims 1, wherein the energy storage apparatus comprises the plurality of module units, and
wherein the energy storage apparatus further comprises a plate-like member on which the plurality of module units are mounted.

9. The energy storage apparatus according to claim 8, wherein adjacently arranged module units included in the plurality of module units are electrically connected.

10. The energy storage apparatus according to claim 8, wherein each of the plurality of module units includes a plurality of the energy storage devices housed in the module case, and wherein the plurality of module units are arranged such that a direction of alignment thereof intersects a direction of alignment of the plurality of energy storage devices included in each of the plurality of module units.

11. The energy storage apparatus according to claim 8, wherein the plate-like member includes first vertical wall at a first end of the plurality of module units in a direction of alignment of the plurality of module units and a second vertical wall at a second end of the plurality of module units in the direction of alignment, and
   wherein the first vertical wall and the second vertical wall each include an opening communicating with the first space.

12. The energy storage apparatus according to claim 8, further comprising a cooling apparatus that introduces a coolant into the module case included in each of the plurality of module units.

13. The energy storage apparatus according to claim 12, wherein the cooling apparatus is opposed to, among the plurality of module units, an outermost module unit in a direction of alignment of the plurality of module units.

14. The energy storage apparatus according to claim 8, wherein the module case included in each of the plurality of module units includes a side wall having a plurality of openings, and
   wherein the side wall includes a pillar that partitions the plurality of openings and extends in a direction intersecting a direction of alignment of the plurality of module units.

15. The energy storage apparatus according to claim 14, wherein the module case includes a pair of side walls that are opposed to each other and each include the pillar, and
   wherein the pillar included in each of the pair of side walls is provided in a different position in the direction of alignment of the plurality of module units.

16. The energy storage apparatus according to claim 1, wherein the first protrusion protrudes from the first case surface in a same direction that the second case surface protrudes from the first case surface.

17. The energy storage apparatus according to claim 1, further comprising a second protrusion that protrudes from at least one of the second case surface of the module case and a side surface of the at least one of the one or more energy storage devices to form a second space defined by the side surface of the at least one of the one or more energy storage devices and the second case surface.

18. The energy storage apparatus according to claim 17, wherein the second protrusion protrudes, orthogonal to the at least one of the second case surface of the module case and the side surface of the at least one of the one or more energy storage devices, from the at least one of the second case surface of the module case and the side surface of the at least one of the one or more energy storage devices.

19. The energy storage apparatus according to claim 17, wherein the second protrusion is an integral part of the second case surface of the module case.

20. The energy storage apparatus according to claim 17, wherein a longitudinal direction of an extension of the second protrusion is orthogonal to a longitudinal direction of an extension of the first protrusion.

* * * * *